(12) United States Patent
Moon et al.

(10) Patent No.: US 10,564,475 B2
(45) Date of Patent: Feb. 18, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Chang-Yul Moon, Gyeonggi-do (KR); Je-Beom Park, Gyeonggi-do (KR); Se-Hyun Park, Gyeonggi-do (KR); Ji-Su Yoon, Gyeonggi-do (KR); Kyu-Hwan Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/141,861

(22) Filed: Sep. 25, 2018

(65) Prior Publication Data

US 2019/0129254 A1 May 2, 2019

(30) Foreign Application Priority Data

Oct. 31, 2017 (KR) .................. 10-2017-0144066

(51) Int. Cl.
*G02F 1/1335* (2006.01)
*F21V 8/00* (2006.01)
*G02F 1/1368* (2006.01)

(52) U.S. Cl.
CPC ....... *G02F 1/133617* (2013.01); *G02B 6/005* (2013.01); *G02B 6/0088* (2013.01); *G02F 1/1368* (2013.01); *G02F 2202/28* (2013.01)

(58) Field of Classification Search
CPC .. G02F 1/133617; G02B 6/005; G02B 6/0088
See application file for complete search history.

(56) References Cited

U.S. PATENT DOCUMENTS

| | | | |
|---|---|---|---|
| 2009/0059121 A1* | 3/2009 | Konno | G02F 1/133605 349/64 |
| 2012/0147295 A1* | 6/2012 | Kasano | G02F 1/133603 349/65 |
| 2013/0003415 A1 | 1/2013 | Park et al. | |
| 2017/0139100 A1* | 5/2017 | Nam | G02B 6/005 |
| 2017/0153366 A1 | 6/2017 | Park et al. | |
| 2018/0039131 A1* | 2/2018 | Szwarcman | C08G 83/001 |
| 2018/0081105 A1* | 3/2018 | Harada | F21V 9/40 |
| 2019/0004375 A1 | 1/2019 | Chang et al. | |

FOREIGN PATENT DOCUMENTS

| | | |
|---|---|---|
| CN | 106200112 A | 12/2016 |
| TW | I503812 B | 10/2015 |
| TW | 201614342 A | 4/2016 |
| TW | I574430 B | 3/2017 |

* cited by examiner

*Primary Examiner* — Donald L Raleigh
(74) *Attorney, Agent, or Firm* — Seed IP Law Group LLP

(57) ABSTRACT

The present disclosure is directed to a liquid crystal display device including a display panel having a red pixel, a green pixel, and a blue pixel; and a backlight unit which emits light to the display panel. The backlight unit includes a light source which outputs a first color light; a color conversion layer which is disposed on the light source and converts the first color light into a second color light; an optical sheet which diffuses or condenses the second color light; and an air gap formed between the color conversion layer and the optical sheet.

31 Claims, 13 Drawing Sheets

BACKLIGHT UNIT AND LIQUID CRYSTAL DISPLAY DEVICE INCLUDING THE SAME

CROSS-REFERENCE TO RELATED APPLICATIONS

This application claims the benefit under 35 U.S.C. § 119(a) of Korean Patent Application No. 2017-0144066, filed on Oct. 31, 2017, in the Korean Intellectual Property Office, which is incorporated herein by reference in its entirety.

BACKGROUND

Technical Field

The present disclosure relates to a backlight unit and a liquid crystal display device including the same.

Description of the Related Art

As an information-oriented society has developed, a variety of needs with respect to a display device for displaying an image have increased. Accordingly, recently, several flat panel display devices, such as a liquid crystal display (LCD) device, a plasma display panel (PDP), an organic electroluminescence display device, have been utilized. Among flat panel display devices, an LCD device displays an image by modulating light, which is incident from a backlight unit, by controlling an electric field applied to a liquid crystal layer.

In such LCDs, backlight units may be classified into a direct light type backlight unit and an edge light type backlight unit depending on an arrangement of light sources. In the direct light type backlight unit, a plurality of light sources are arranged on a rear surface of an LCD panel and light emitted by the light sources is transmitted toward the LCD panel. On the other hand, in the edge light type backlight unit, a plurality of light sources are arranged on one side of a bottom of an LCD panel and light emitted by the light sources is transmitted toward the LCD panel by using a light guide plate.

For the light sources of the direct light type or edge light type backlight unit, white light in which blue light, red light, and green light are mixed, is emitted toward the rear surface of the LCD panel or a side of the light guide plate. Here, the green light is generated by a green fluorescent material absorbing the blue light, and the red light is generated by a red fluorescent material absorbing the blue light.

Referring to FIG. 1, it may be seen that a part of a green light emitting area overlaps a red color absorption area. Due to such properties, since the red fluorescent material absorbs the green light as much as an area R in which the green light emitting area overlaps the red color absorption area, the green light is reduced. Accordingly, luminance of light is reduced.

BRIEF SUMMARY

Embodiments relate to a backlight unit capable of improving luminance of light and a liquid crystal display device including the backlight unit.

One or more embodiments relate to a liquid crystal display device including: a display panel which comprises a red pixel, a green pixel, and a blue pixel; and a backlight unit which emits light to the display panel, wherein the backlight unit includes: a light source which outputs a first color light; a color conversion layer which is disposed on the light source and converts the first color light into a second color light; an optical sheet which diffuses or condenses the second color light; and an air gap formed between the color conversion layer and the optical sheet.

One or more embodiments relate to a backlight unit including: a light source which outputs a first color light; a color conversion layer which is disposed on the light source and converts the first color light into a second color light; an optical sheet which diffuses or condenses the second color light; and an air gap formed between the color conversion layer and the optical sheet, wherein the first color light comprises blue light, and the second color light includes green light.

Advantages and features of the disclosure will be set forth in part in the description which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are explanatory and are intended to provide further explanation of the embodiments as claimed.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
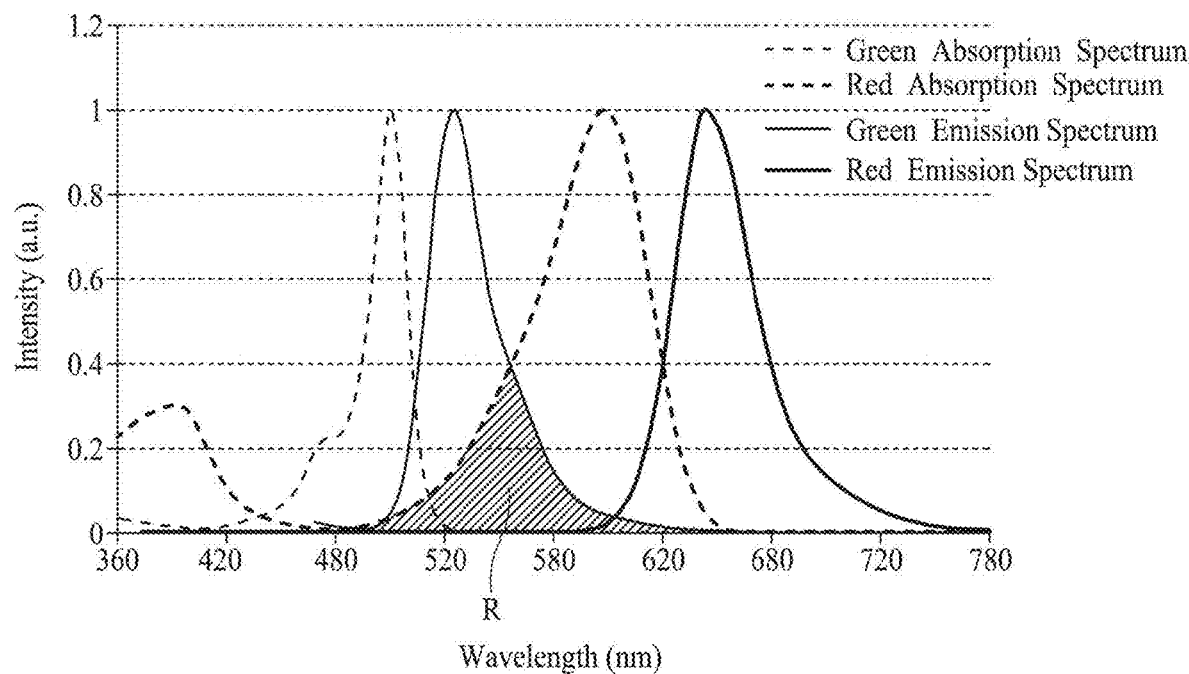
FIG. 1 is a graph illustrating absorption spectrums and luminescence spectrums with respect to red and green according to the related art.

Hereinafter, embodiments of the present disclosure will be described in detail with reference to the attached drawings.

Advantages and features of the present disclosure and a method of achieving the same will become apparent with reference to the attached drawings and embodiments described below in detail. However, the present disclosure is not limited to the embodiments described below and may be embodied with a variety of different modifications. The embodiments are merely provided to allow one of ordinary skill in the art to completely understand the scope of the present disclosure.

Shapes, sizes, ratios, angles, numbers, and the like shown in the drawings to explain the embodiments of the present disclosure are merely examples, and the present disclosure is not limited to the shown in the drawings. Throughout the specification, like reference numerals refer to like elements. In the description of the embodiments of the present disclosure, a detailed description of a well-known technology of the related art will be omitted when it is deemed to obscure the essence of the present disclosure.

When "comprise," "have," "include," and the like are stated herein, another parts may be added unless "only" is used. Singular expressions of components, unless particularly defined otherwise, include plural expressions thereof.

When a component is interpreted, an error range is included without an additional explicit statement thereof.

In a description on a position relationship, when a position relationship between two parts is described as, for example, "on," "above," "below," "beside," and the like, one or more other parts may be located between the two parts unless "just" or "directly" is used.

In a description on a time relationship, when a temporal order relationship is described as, for example, "after," "next to," "and then," "before," and the like, discontinuous cases may also be included unless "just" or "directly" is used.

Terms such as first, second, and the like are used for describing a variety of components. However, the components will not be limited by the terms. The terms are used merely for distinguishing one component from others. Accordingly, a first component stated below may be a second component within the technical concept of the present disclosure.

A relationship among "x-axis direction," "y-axis direction," and "z-axis direction" should not be interpreted as a vertically formed geometrical relationship and may mean having directionality wider than a functionally operable range of a component in the present disclosure.

The term "at least one" should be understood as including all combinations of one or more related items. For example, "at least one of a first item, a second item, and a third item" may mean not only each of the first item, the second item, and the third item but also any combinations of all items from two or more of the first item, the second item, and the third item.

Features of a variety of embodiments of the present disclosure may be partially or entirely combined or mixed with one another and may perform technically diverse interconnection and drive, and the embodiments may be independently performed from one another or may be performed together in a correlation.

Hereinafter, exemplary embodiments of the present disclosure will be described in detail with reference to the attached drawings.

Figure 2:
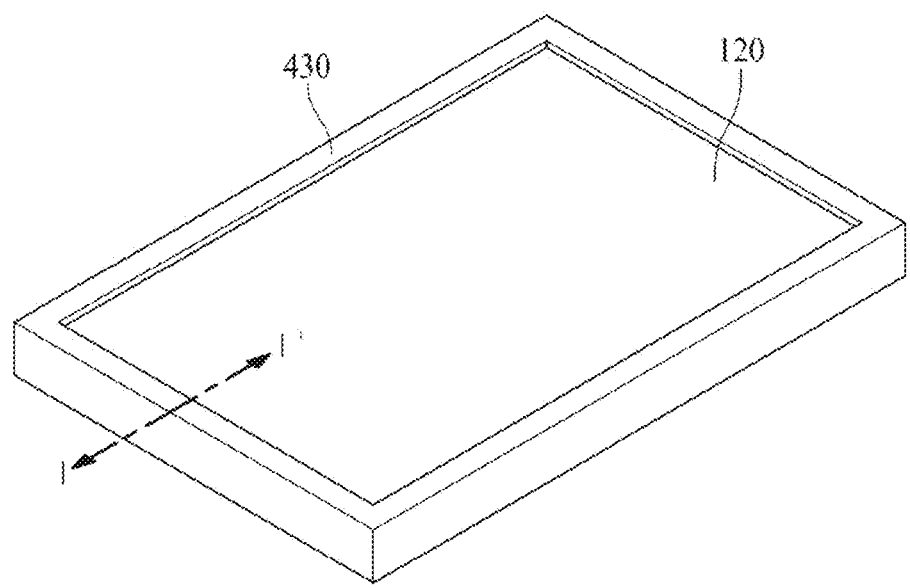
FIG. 2 is a perspective view of a liquid crystal display device according to one embodiment of the present disclosure.
Figure 3:
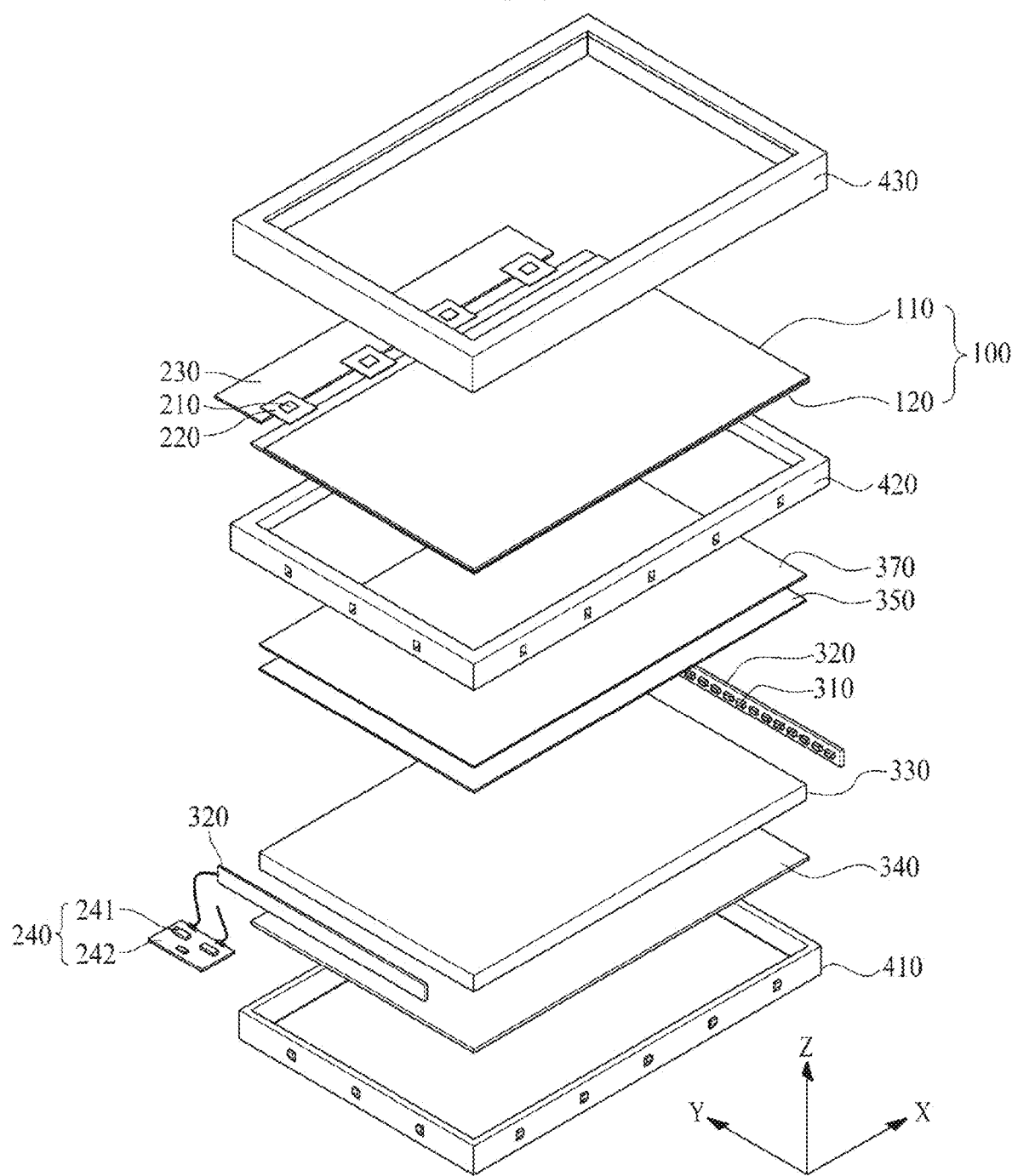
FIG. 3 is an exploded perspective view of the liquid crystal display device of FIG. 2.
Figure 4:
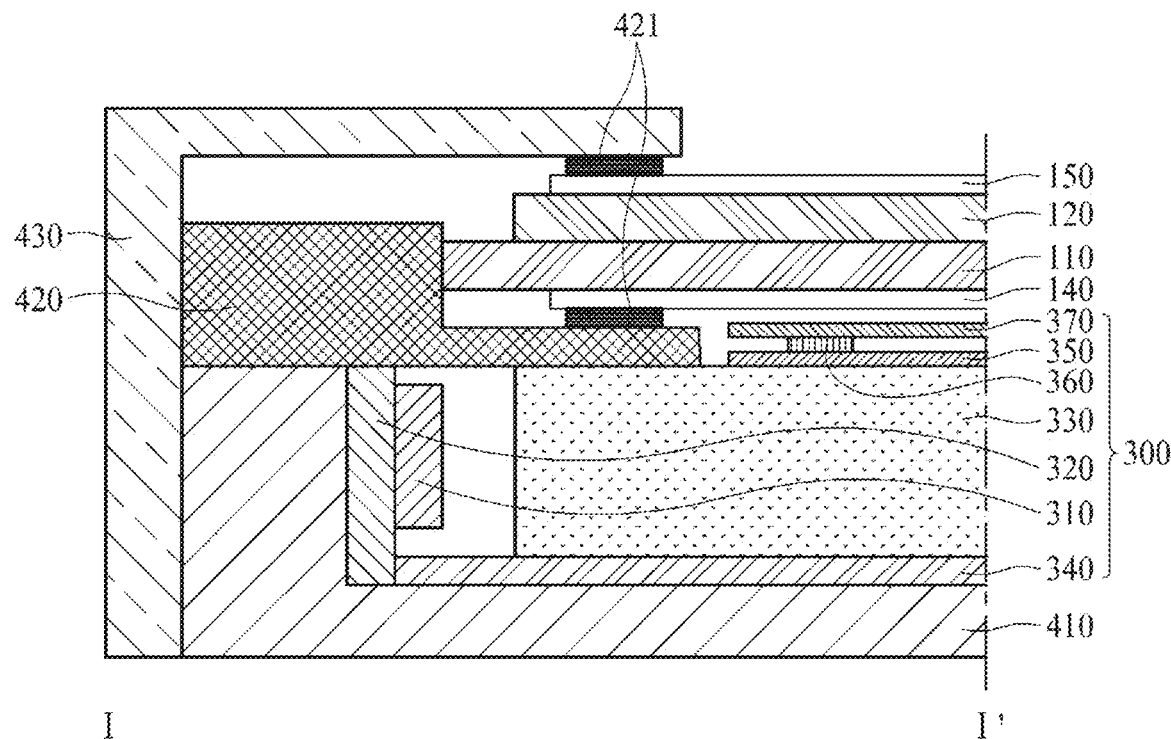
FIG. 4 is a cross-sectional view taken along I-I' in FIG. 2.

FIG. 2 is a perspective view of a liquid crystal display device according to one embodiment of the present disclosure. FIG. 3 is an exploded perspective view of the liquid crystal display device of FIG. 2. FIG. 4 is a cross-sectional view taken along I-I' in FIG. 2.

Referring to FIGS. 2 to 4, the liquid crystal display device according to one embodiment of the present disclosure includes a display panel 100, a drive circuit portion for driving the display panel 100, a backlight unit 300, and a case member.

The display panel 100 includes a lower substrate 110, an upper substrate 120, and a liquid crystal layer interposed between the lower substrate 110 and the upper substrate 120. The lower substrate 110 and the upper substrate 120 may be formed of glass or plastic.

The lower substrate 110 may have a size larger than a size of the upper substrate 120.

Accordingly, flexible source films 220 may be attached to an edge of one side of a top surface of the lower substrate 110 which is not covered by the upper substrate 120. The top surface of the lower substrate 110 corresponds to a surface which faces the upper substrate 120.

Signal lines and pixels are provided on the top surface of the lower substrate 110 of the display panel 100. The signal lines may include data lines and gate lines which overlap one another, a common line for supplying a common voltage to common electrodes, and gate control signal lines through which gate control signals are supplied as control signals to a gate drive circuit. Pixels may be arranged in an intersection or overlap area between the data lines and the gate lines. Each of the pixels includes a thin film transistor (TFT), a pixel electrode, and the common electrode. The TFT supplies a data voltage of the data line to the pixel electrode in response to receiving a gate signal of the gate line.

Liquid crystals of the liquid crystal layer are driven by an electric field generated by a potential difference between the data voltage supplied to the pixel electrode and the common voltage supplied to the common electrode such that a transmission amount of light, which is incident from the backlight unit, may be adjusted.

A black matrix and a color filter may be provided on a bottom surface of the upper substrate 120 of the display panel 100. The bottom surface of the upper substrate 120 corresponds to a surface which faces the lower substrate 110. However, when the display panel 100 is formed using a color filter on TFT array (COT), the black matrix and the color filter may be provided on the top surface of the lower substrate 110.

The common electrode may be provided on the bottom surface of the upper substrate 120 in a perpendicular electric field drive method, such as a twisted nematic (TN) mode and a vertical alignment (VA) mode, or may be provided on the top surface of the lower substrate 110 in a horizontal electric field drive method, such as an in-plane switching (IPS) mode and a fringe field switching (FFS) mode.

The black matrix includes a light-barrier material formed in a matrix structure so as to prevent light from leaking into areas except a pixel area.

The color filter is formed in the pixel area between the black matrixes. The color filter includes a red color filter, a green color filter, and a blue color filter.

An upper polarizing plate 150 is attached to the upper substrate 120 of the display panel 100, and a lower polarizing plate 140 is attached to the lower substrate 110. A light transmission axis of the upper polarizing plate 150 intersects with or crosses a light transmission axis of the lower polarizing plate 140. Also, an alignment film for setting a pre-tilt angle of liquid crystals may be formed on inner sides of the upper substrate 120 and the lower substrate 110 which are in contact with the liquid crystals.

The drive circuit portion includes the gate drive circuit, source drive circuits 210, the flexible source films 220, a circuit board 230, and a light source drive portion 240.

The gate drive circuit supplies the gate signals to the gate lines of the lower substrate 110. The gate drive circuit may be formed directly on the top surface of the lower substrate 110 by using a gate driver in panel (GIP) method. Otherwise, when the gate drive circuit is embodied as a drive chip, the gate driving circuit may be mounted on a flexible gate film by using a chip on film (COF) method, and the flexible gate films may be attached to the edge of the top surface of the lower substrate 110 which is not covered by the upper substrate 120.

The source drive circuits 210 supply the data voltages to the data lines of the lower substrate 110. When each of the source drive circuits 210 is embodied as a drive chip, each of the source drive circuits 210 may be mounted on the flexible source film 220 by using a COF method. Otherwise, the source drive circuits 210 may be adhered to the top surface of the lower substrate 110 by using a chip on glass (COG) method or a chip on plastic (COP) method. The flexible source films 220 may be attached to the edge of the one side of the top surface of the lower substrate 110 which are not covered by the upper substrate 120 and the circuit board 230. The circuit board 230 may be embodied as a printed circuit board (PCB).

The light source drive portion 240 includes a light source drive circuit 241 and a light source circuit board 242.

The light source drive circuit 241 supplies drive currents to light sources 310 to allow the light sources 310 to emit light. The light source drive circuit 241 may be mounted on the light source circuit board 242. Otherwise, the light source drive circuit 241 may be mounted on the circuit board 230. In this case, the light source circuit board 242 may be omitted.

The drive circuit portion may further include a timing control circuit and a control circuit board on which the timing control circuit is mounted. In this case, the control circuit board may be connected to the circuit board 230 through a certain flexible cable.

The backlight unit 300 includes a plurality of such light sources 310, a light source circuit board 320, a light guide plate 330, a reflection sheet 340, optical sheets 370, and the like. The backlight unit 300 converts light from the light sources 310 into a uniform surface light source through the light guide plate 330 and the optical sheets 370 and emits light toward the display panel 100. Although the backlight unit is described with reference to FIGS. 3 and 4 as being embodied as an edge light type, it should be noted that the backlight unit is not limited thereto and may be embodied as a direct light type.

The light sources 310 may be embodied as light emitting diodes (LEDs). Here, the LEDs may include at least one of a blue LED which outputs blue light, a red LED which outputs red light, and a magenta LED which outputs magenta light, in which blue light and red light are mixed.

The light sources 310 are arranged on at least one side surface of the light guide plate 330 and emit light toward the side surface of the light guide plate 330. The light sources 310 are mounted on the light source circuit board 320 and turned on or off by receiving drive currents of the light source drive circuit 241. The light source circuit board 320 is connected to the light source drive portion 240.

The light guide plate 330 converts light from the light sources 310 into a surface light source and emits light toward the display panel 100. The reflection sheet 340 is disposed on a bottom surface of the light guide plate 330 and reflects light, which moves from the light guide plate 330 toward the bottom of the light guide plate 330, toward the light guide plate 330.

An optical sheet 370 is disposed between the light guide plate 330 and the display panel 100. That is, the optical sheet 370 is disposed below the display panel 100, and the light guide plate 330 is disposed below the optical sheets 370. The optical sheet 370 includes one or more prism sheets or one or more diffusion sheets, diffuses light which is incident from the light guide plate 330, and refracts a progression path of light to allow the light to be incident on a light-incident surface of the display panel 100 at a substantially vertical angle. Also, the optical sheet 370 may include a dual brightness enhancement film (DBEF). For example, the optical sheets 370 may include a diffusion sheet, a prism sheet, and a DBEF. In this case, an uppermost optical sheet of the optical sheets 370 may be a DBEF.

A color conversion layer 350 is disposed on the light guide plate 330 and converts blue light or magenta light which is incident from the light sources 310 through the light guide plate 330 into white light. The color conversion layer 350 according to the embodiment may also include a green color conversion layer which converts blue light or magenta light into green light.

An adhesive layer 360 is disposed between the color conversion layer 350 and the optical sheet 370. The adhesive layer 360 allows the color conversion layer 350 and the optical sheet 370 to adhere to each other and forms an air gap between the color conversion layer 350 and the optical sheet

370. A detailed description of the color conversion layer 350 and the adhesive layer 360 will be described below with reference to FIGS. 5 to 11.

The case member includes a bottom cover 410, a support frame 420, and a top case 430.

The bottom cover 410 is manufactured as a square metal frame and surrounds a side surface and a bottom surface of the backlight unit 300 as shown in FIG. 4. The bottom cover 410 may be manufactured using a high strength steel plate, for example, an electro galvanized iron (EGI) plate, a steel use stainless (SUS) plate, a galvarium (SGLC) steel sheet, an aluminum-plated steel sheet (ALCOSTA), a tin-plated steel sheet (SPTE), and the like.

The support frame 420 supports a bottom surface of the lower substrate 110 of the display panel 100. The support frame 420 is sometimes referred to as a guide panel, a guide frame, or the like. The support frame 420 may be fixedly combined with the bottom cover 410 by using a fixing member. The support frame 420 may be manufactured as a square frame formed of glass fibers mixed in a synthetic resin, such as polycarbonate and the like, or may be manufactured using an SUS plate. In addition, a buffering member 421 may be provided between the lower substrate 110 and the support frame 420 as shown in FIG. 4 to protect the lower substrate 110 of the display panel 100 from being shocked by the support frame 420.

The top case 430 surrounds edges of the display panel 100, a top surface and a side surface of the support frame 420, and side surfaces of the bottom cover 410. The top case 430 may be manufactured using, for example, an EGI plate, an SUS plate, or the like. The top case 430 may be fixed to the support frame 420 by using, for example, a hook or a screw. In addition, the buffering member 421 may be provided between the upper substrate 120 and the top case 430 as shown in FIG. 4 to protect the upper substrate 120 of the display panel 100 from being shocked by the top case 430.

First Embodiment

Figure 5:
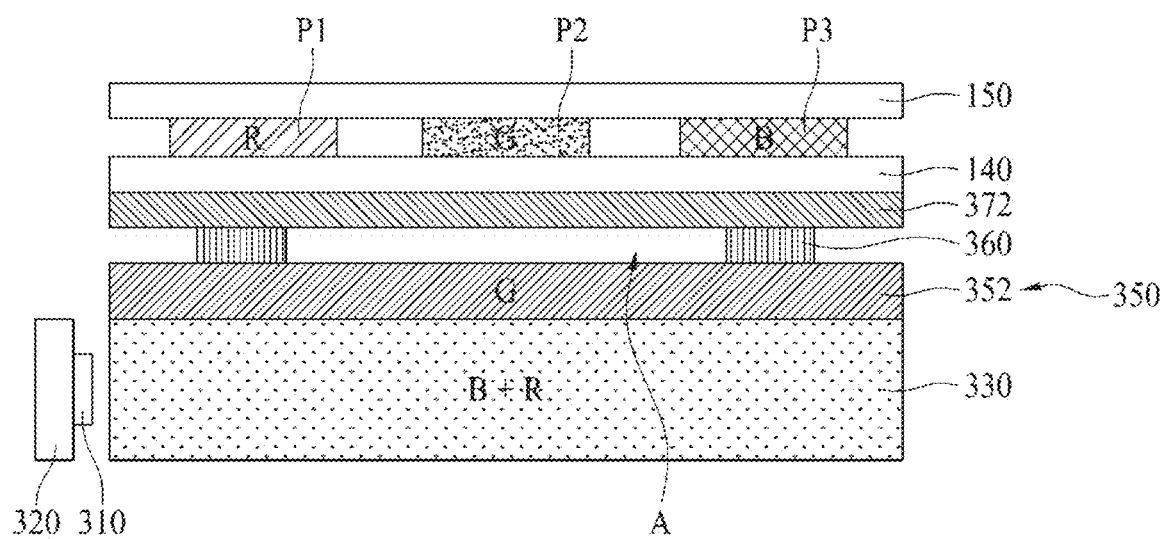
FIG. 5 is a schematic cross-sectional view illustrating a first embodiment of a color conversion layer and an adhesive layer.

FIG. 5 is a schematic cross-sectional view illustrating a first embodiment of the color conversion layer and the adhesive layer.

Referring to FIG. 5, a liquid crystal display device includes the display panel 100 and the backlight unit 300.

The backlight unit 300 includes the light sources 310, the light guide plate 330, a green color conversion layer 352, the adhesive layer 360, and a prism sheet 372.

The light sources 310 may include a blue LED which emits blue light and a red LED which emits red light or may include a magenta LED which emits magenta light, in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the first embodiment of the present disclosure, on the light guide plate 330, blue light may be incident from the blue LED, and red light may be incident from the red LED. Here, the blue light and the red light may be mixed in the light guide plate 330 to become the magenta light. In addition, on the light guide plate 330, magenta light may be incident from the magenta LED.

Accordingly, the light guide plate 330 allows the magenta light to proceed toward the display panel 100. The green color conversion layer 352 is formed on the light guide plate 330 to overlap a plurality of pixels P1, P2, and P3. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which has passed through the green color conversion layer 352 is mixed with each other and converted into white light.

The above-described green light emitting material includes, for example, a green phosphorescent material or a green fluorescent material and is mixed with a transparent resin material, such as a silicone resin, to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372. The adhesive layer 360 is formed on a portion of a top surface of the green color conversion layer 352 so as to allow the prism sheet 372 to adhere to the green color conversion layer 352 simultaneously while forming an air gap A between the green color conversion layer 352 and the prism sheet 372. Here, the adhesive layer 360 is formed so as to not overlap a green (G) pixel P2 such that green light generated by the green color conversion layer 352 proceeds toward the G pixel P2 without luminance reduction. That is, the adhesive layer 360 is formed to overlap a red (R) pixel P1 and a blue (B) pixel P3 as shown in FIG. 5.

The display panel 100 includes the lower polarizing plate 140, the upper polarizing plate 150, and a plurality of such pixels P1, P2, and P3.

The lower polarizing plate 140 is disposed at the bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

The red color filter includes red color which transmits light having a red wavelength and absorbs light having other wavelengths. The green color filter includes green color which transmits light having a green wavelength and absorbs light having other wavelengths. The blue color filter includes blue color which transmits light having a blue wavelength and absorbs light having other wavelengths.

Accordingly, in the R pixel P1, as the white light generated by the green color conversion layer 352 passes through the red color filter, blue light and green light are absorbed and red light is emitted. In the G pixel P2, as the white light generated by the green color conversion layer 352 passes through the green color filter, blue light and red light are absorbed and green light is emitted. In the B pixel P3, as the white light generated by the green color conversion layer 352 passes through the blue color filter, red light and green light are absorbed and blue light is emitted.

Figure 12:
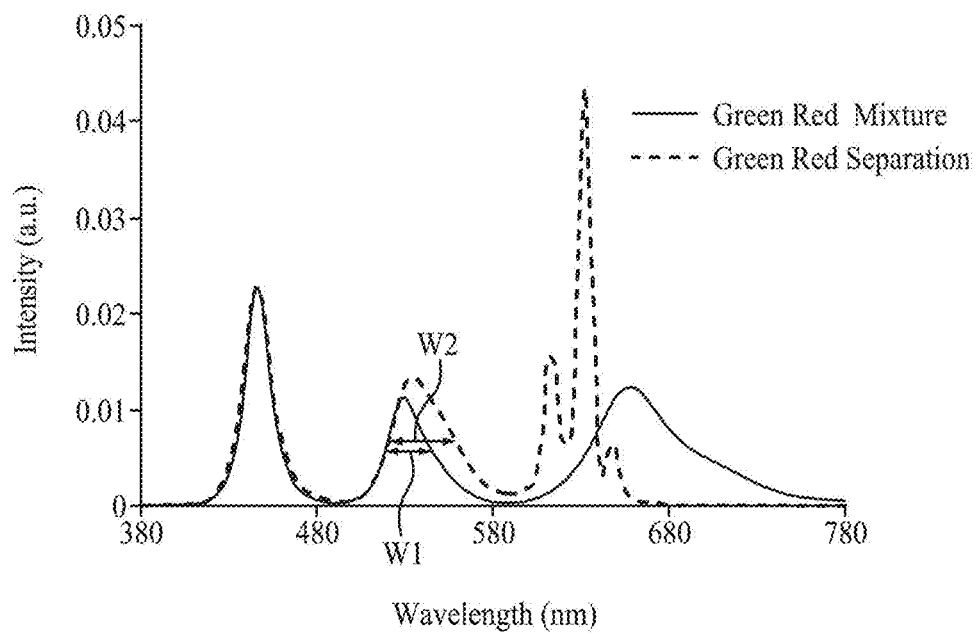
FIG. 12 is a graph illustrating an increase in luminance of a configuration in which red light and green light are spatially separated.

In the liquid crystal display device according to the first embodiment of the present disclosure, blue light and red light are emitted by the light sources 310 and green light is generated by the green color conversion layer 352. That is, since red light and green light are spatially separated and the red light is generated first followed by generation of the green light, the liquid crystal display device prevents a red light emitting material from absorbing the green light. Accordingly, in the liquid crystal display device according to the first embodiment of the present disclosure, the green light increases and a half width of a green peak increases, as shown in FIG. 12, such that luminance of light may be expected to increase.

Also, the liquid crystal display device according to the first embodiment of the present disclosure may prevent a light-condensing function of the prism sheet 372 from being degraded due to a scattering property caused by the green light emitting material of the green color conversion layer 352 by forming the air gap A between the green color conversion layer 352 and the prism sheet 372. This structure will be described below in detail with reference to FIGS. 13A to 15.

In addition, although it is assumed in FIG. 5 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Second Embodiment

Figure 6:
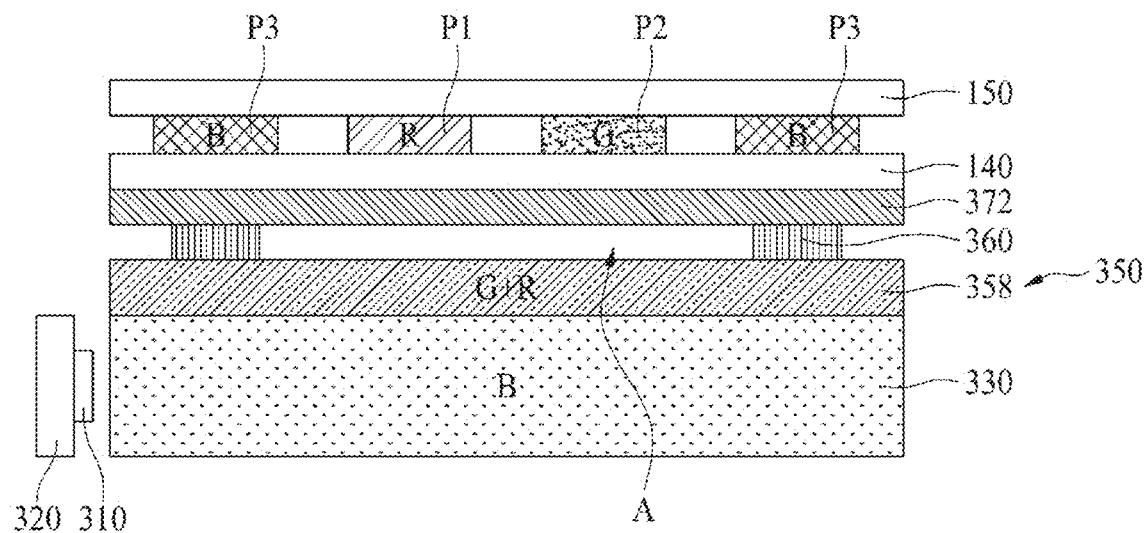
FIG. 6 is a schematic cross-sectional view illustrating a second embodiment of the color conversion layer and the adhesive layer.

FIG. 6 is a schematic cross-sectional view illustrating a second embodiment of the color conversion layer and the adhesive layer.

Referring to FIG. 6, a liquid crystal display device includes the display panel 100 and the backlight unit 300.

The backlight unit 300 includes the light sources 310, the light guide plate 330, a mixed color conversion layer 358, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the second embodiment of the present disclosure, on the light guide plate 330, blue light may be incident from the blue LED. Accordingly, the light guide plate 330 allows the blue light to proceed toward the display panel 100.

The mixed color conversion layer 358 is formed on the light guide plate 330 to overlap a plurality of pixels P1, P2, and P3. The mixed color conversion layer 358 is disposed on a path of light which proceeds toward the display panel 100 from the light guide plate 330 and converts the blue light emitted by the light guide plate 330 into white light. In more detail, the mixed color conversion layer 358 includes a red light emitting material and a green light emitting material. The red light emitting material included in the mixed color conversion layer 358 collides with a part of the blue light and absorbs energy of the blue light. Accordingly, a wavelength of the part of the blue light is changed into that of the red light. Also, the green light emitting material included in the mixed color conversion layer 358 collides with a part of the blue light and absorbs energy of the blue light. Accordingly, a wavelength of the part of the blue light is changed into that of the green light. When the light passing through the mixed color conversion layer 358 is mixed, the blue light, the red light, and the green light are mixed and converted into white light.

The above-described red light emitting material includes, for example, a red phosphorescent material or a red fluorescent material and is mixed with a transparent resin material, such as a silicone resin, to form the mixed color conversion layer 358. The above-described green light emitting material includes, for example, a green phosphorescent material or a green fluorescent material and is mixed with a transparent resin material, such as a silicone resin, to form the mixed color conversion layer 358. The prism sheet 372 condenses white light which is incident in a first direction. Here, the first direction may correspond to a major axis direction or a minor axis direction of the light guide plate 330.

The adhesive layer 360 is disposed between the mixed color conversion layer 358 and the prism sheet 372. The adhesive layer 360 is formed on a portion of a top surface of the mixed color conversion layer 358 so as to allow the prism sheet 372 to adhere to the mixed color conversion layer 358 simultaneously while forming an air gap A between the mixed color conversion layer 358 and the prism sheet 372.

Here, it the adhesive layer 360 is formed to not overlap a red pixel P1 and a green pixel P2 such that the red light and the green light generated by the mixed color conversion layer 358 may proceed to the red pixel P1 and the green pixel P2 without luminance reduction.

That is, the adhesive layer 360 is formed to overlap the B pixel P3 as shown in FIG. 6.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the mixed color conversion layer 358 passes through the red color filter, blue light and green light are absorbed and red light is emitted. In the G pixel P2, as the white light generated by the mixed color conversion layer 358 passes through the green color filter, blue light and red light are absorbed and green light is emitted. In the B pixel P3, as the white light generated by the mixed color conversion layer 358 passes through the blue color filter, red light and green light are absorbed and blue light is emitted.

The liquid crystal display device according to the second embodiment of the present disclosure may prevent a light-condensing function of the prism sheet 372 from being degraded due to a scattering property caused by the red light emitting material and the green light emitting material of the mixed color conversion layer 358 by forming the air gap A between the mixed color conversion layer 358 and the prism sheet 372.

In addition, although it is assumed in FIG. 6 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a mixed color conversion layer.

Third Embodiment

Figure 7:
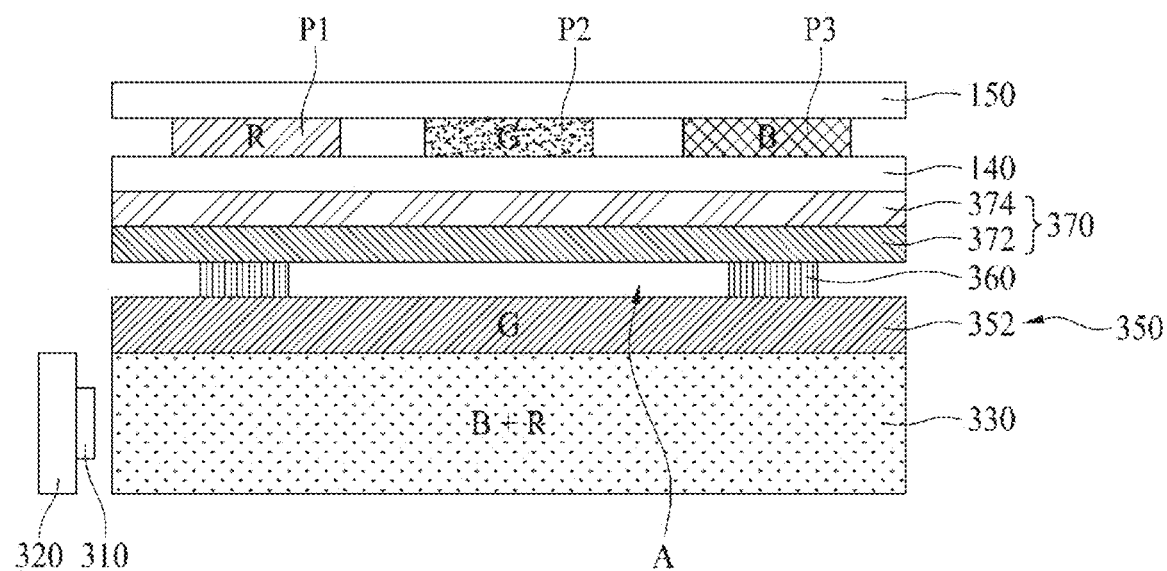
FIG. 7 is a schematic cross-sectional view illustrating a third embodiment of the color conversion layer and the adhesive layer.

FIG. 7 is a schematic cross-sectional view illustrating a third embodiment of the color conversion layer and the adhesive layer. In FIG. 7, the liquid crystal display device shown in FIG. 5 may further include a diffusion sheet 374. The diffusion sheet 374 is disposed on the prism sheet 372 and diffuses light which is incident thereon.

Since other components are substantially similar to those of FIG. 5, a description thereof will be omitted.

Fourth Embodiment

Figure 8:
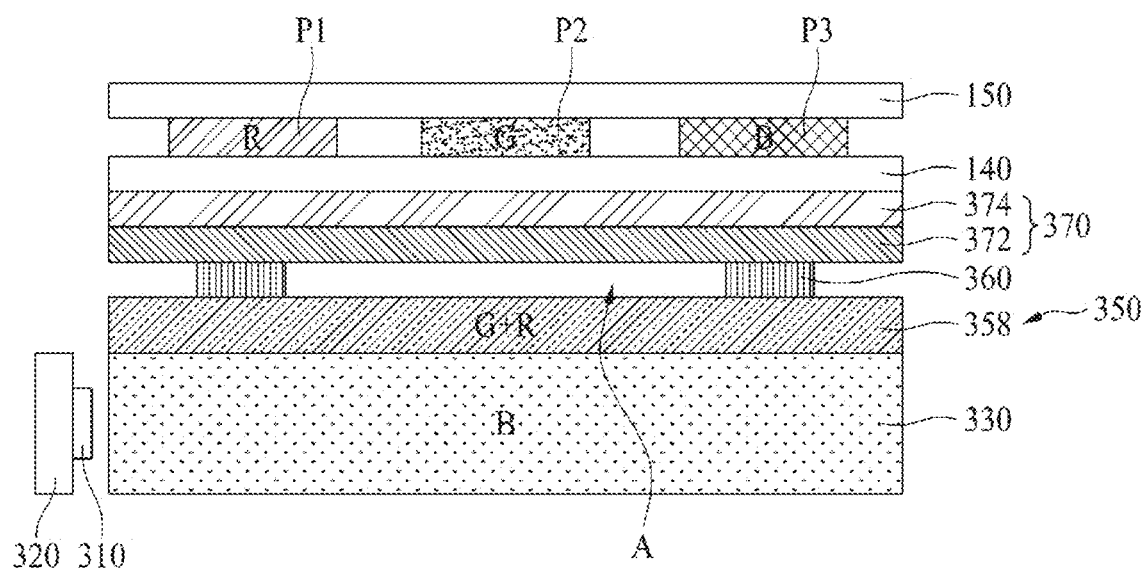
FIG. 8 is a schematic cross-sectional view illustrating a fourth embodiment of the color conversion layer and the adhesive layer.

FIG. 8 is a schematic cross-sectional view illustrating a fourth embodiment of the color conversion layer and the adhesive layer. In FIG. 8, the liquid crystal display device shown in FIG. 6 may further include the diffusion sheet 374. The diffusion sheet 374 is disposed on the prism sheet 372 and diffuses light which is incident thereon.

Since other components are substantially similar to those of FIG. 6, a description thereof will be omitted.

Fifth Embodiment

Figure 9:
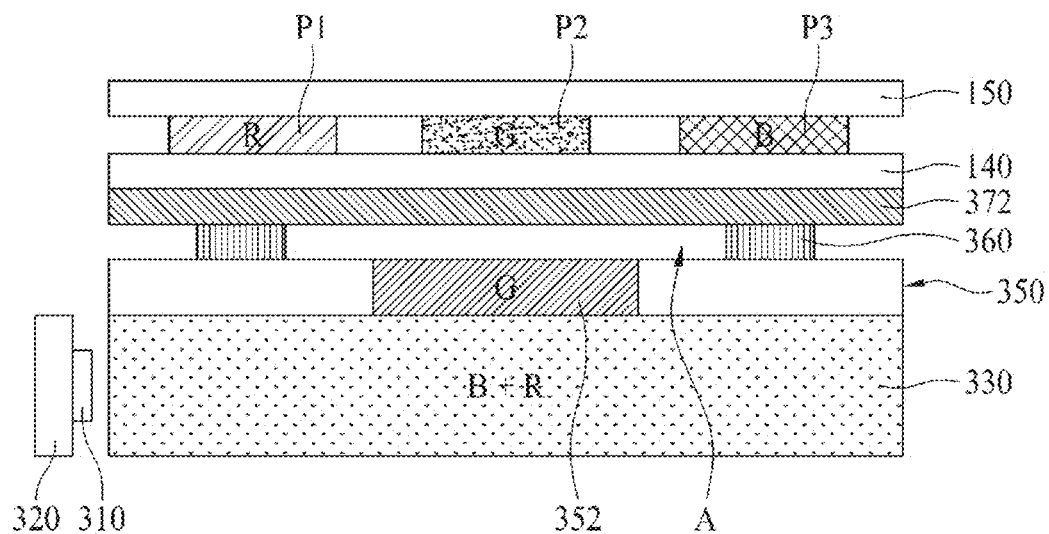
FIG. 9 is a schematic cross-sectional view illustrating a fifth embodiment of the color conversion layer and the adhesive layer.

FIG. 9 is a schematic cross-sectional view illustrating a fifth embodiment of the color conversion layer and the adhesive layer.

Referring to FIG. 9, a liquid crystal display device includes the display panel 100 and the backlight unit 300.

The backlight unit 300 includes the light sources 310, the light guide plate 330, the green color conversion layer 352, the adhesive layer 360, and the prism sheet 372.

The light sources 310 may include a blue LED which emits blue light and a red LED which emits red light or may include a magenta LED which emits magenta light, in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the fifth embodiment of the present disclosure, on the light guide plate 330, blue light may be incident from the blue LED, and red light may be incident from the red LED. Here, the blue light and the red light may be mixed in the light guide plate 330 to become the magenta light. In addition, on the light guide plate 330, magenta light may be incident from the magenta LED. Accordingly, the light guide plate 330 allows the magenta light to proceed toward the display panel 100.

The green color conversion layer 352 is formed on the light guide plate 330 to overlap the G pixel P2. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light, and green light which has passed through the green color conversion layer 352 is mixed with each other and converted into white light.

The above-described green light emitting material includes, for example, a green phosphorescent material or a green fluorescent material and is mixed with a transparent resin material, such as a silicone resin, to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372. The adhesive layer 360 is formed on a portion of a top surface of the green color conversion layer 352 so as to allow the prism sheet 372 to adhere to the green color conversion layer 352 simultaneously while forming an air gap A between the green color conversion layer 352 and the prism sheet 372. Here, the adhesive layer 360 is formed to not overlap a G pixel P2 such that green light generated by the green color conversion layer 352 proceeds toward the G pixel P2 without luminance reduction. That is, the adhesive layer 360 is formed to overlap an R pixel P1 and a B pixel P3 as shown in FIG. 9.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light which is incident from the light guide plate 330 passes through the red color filter, the blue light is absorbed and the red light is emitted. In the G pixel P2, as the white light generated by the green color conversion layer 352 passes through the green color filter, the blue light and red light are absorbed and the green light is emitted. In the B pixel P3, when the magenta light which is incident from the light guide plate 330 passes through the blue color filter, the red light is absorbed and the blue light is emitted.

In addition, although it is assumed in FIG. 9 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Sixth Embodiment

Figure 10:
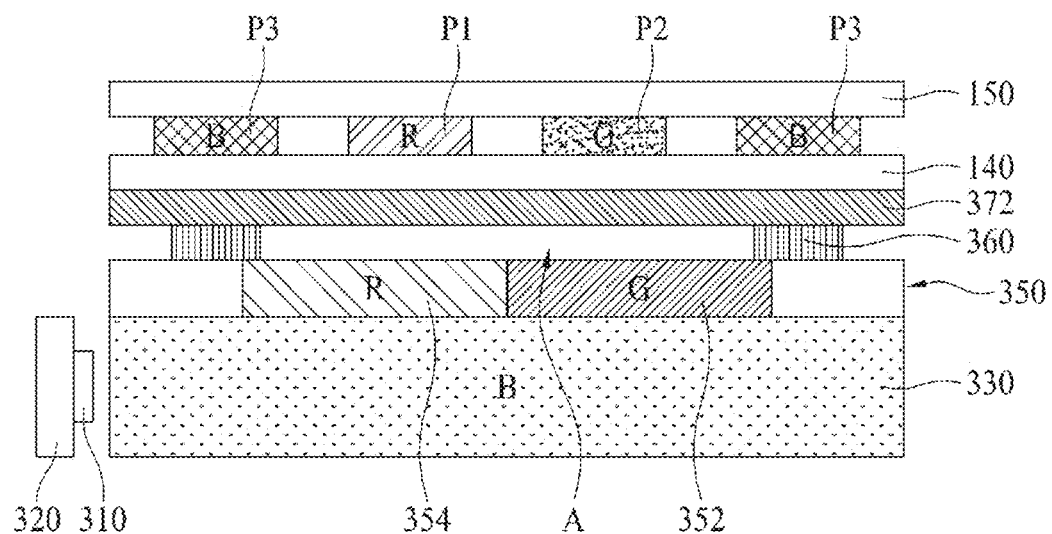
FIG. 10 is a schematic cross-sectional view illustrating a sixth embodiment of the color conversion layer and the adhesive layer.

FIG. 10 is a schematic cross-sectional view illustrating a sixth embodiment of the color conversion layer and the adhesive layer.

Referring to FIG. 10, a liquid crystal display device includes the display panel 100 and the backlight unit 300.

The backlight unit 300 includes the light sources 310, the light guide plate 330, the color conversion layer 350, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the sixth embodiment of the present disclosure, on the light guide plate 330, the blue light may be incident from the blue LED. Accordingly, the light guide plate 330 allows the blue light to proceed toward the display panel 100.

The color conversion layer 350 is disposed between the light guide plate 330 and the display panel 100 and includes a red color conversion layer 354 and the green color conversion layer 352 which is flush with the red color conversion layer 354.

The red color conversion layer 354 is formed on the light guide plate 330 to overlap an R pixel P1. The red color conversion layer 354 is disposed on a path of light which proceeds toward the display panel 100 from the light guide plate 330 and converts the blue light emitted by the light guide plate 330 into magenta light. In more detail, the red color conversion layer 354 includes a red light emitting material. The red light emitting material included in the red color conversion layer 354 collides with a part of the blue light and absorbs energy of the blue light. Accordingly, a wavelength of the part of the blue light is changed into that of the red light, and the blue light and red light which has passed through the red color conversion layer 354 is mixed with each other and converted into magenta light.

The above-described red light emitting material includes, for example, a red phosphorescent material or a red fluorescent material and is mixed with a transparent resin material, such as a silicone resin, to form the red color conversion layer 354.

The green color conversion layer 352 is formed on the light guide plate 330 to overlap the G pixel P2. The green color conversion layer 352 is disposed on a path of light which proceeds toward the display panel 100 from the light guide plate 330 and converts the blue light emitted by the light guide plate 330 into cyan light. In more detail, the green color conversion layer 352 includes a green light emitting material. The green light emitting material included in the green color conversion layer 352 collides with a part of the blue light and absorbs energy of the blue light. Accordingly, a wavelength of the part of the blue light is changed into that of green light, and blue light and green light which has passed through the green color conversion layer 352 is mixed with each other and converted into cyan light. The magenta light and the cyan light are mixed to form white light.

The above-described green light emitting material includes, for example, a green phosphorescent material or a green fluorescent material and is mixed with a transparent resin material, such as a silicone resin, to form the green color conversion layer 352.

The prism sheet 372 condenses white light, which is incident thereon, in a first direction. Here, the first direction may correspond to a major axis direction or a minor axis direction of the light guide plate 330.

The adhesive layer 360 is disposed between the color conversion layer 350 and the prism sheet 372. The adhesive layer 360 is formed on a portion of a top surface of the color conversion layer 350 so as to allow the prism sheet 372 to adhere to the color conversion layer 350 simultaneously while forming an air gap A between the color conversion layer 350 and the prism sheet 372. Here, the adhesive layer 360 is formed to not overlap a G pixel P2 such that the green light generated by the green color conversion layer 352 proceeds toward the G pixel P2 without luminance reduction. Here, the adhesive layer 360 is formed to not overlap an R pixel P1 such that the red light generated by the red color conversion layer 354 proceeds toward the R pixel P1 without luminance reduction. That is, the adhesive layer 360 is formed to overlap a B pixel P3 as shown in FIG. 10.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light generated by the red color conversion layer 354 passes through the red color filter, blue light is absorbed and red light is emitted. In the G pixel P2, when the cyan light generated by the green color conversion layer 352 passes through the green color filter, the blue light is absorbed and the green light is emitted. In the B pixel P3, the blue light which is incident from the light guide plate 330 passes through the blue color filter as it is and is emitted.

In the liquid crystal display device according to the sixth embodiment of the present disclosure, the light sources 310 emit blue light. Red light is generated by the red color conversion layer 354, and green light is generated by the green color conversion layer 352. That is, since red light and green light are spatially separated, the liquid crystal display device prevents the red light emitting material from absorbing the green light. Accordingly, in the liquid crystal display device according to the sixth embodiment of the present disclosure, the green light increases and a half width of a green peak increases, as shown in FIG. 12, such that luminance of light may be expected to increase.

Also, the liquid crystal display device according to the sixth embodiment of the present disclosure may prevent a light-condensing function of the prism sheet 372 from being degraded due to a scattering property caused by the green light emitting material or the red light emitting material of the color conversion layer 350 by forming the air gap A between the color conversion layer 350 and the prism sheet 372.

In addition, although it is assumed in FIG. 10 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a color conversion layer.

Seventh Embodiment

Figure 11:
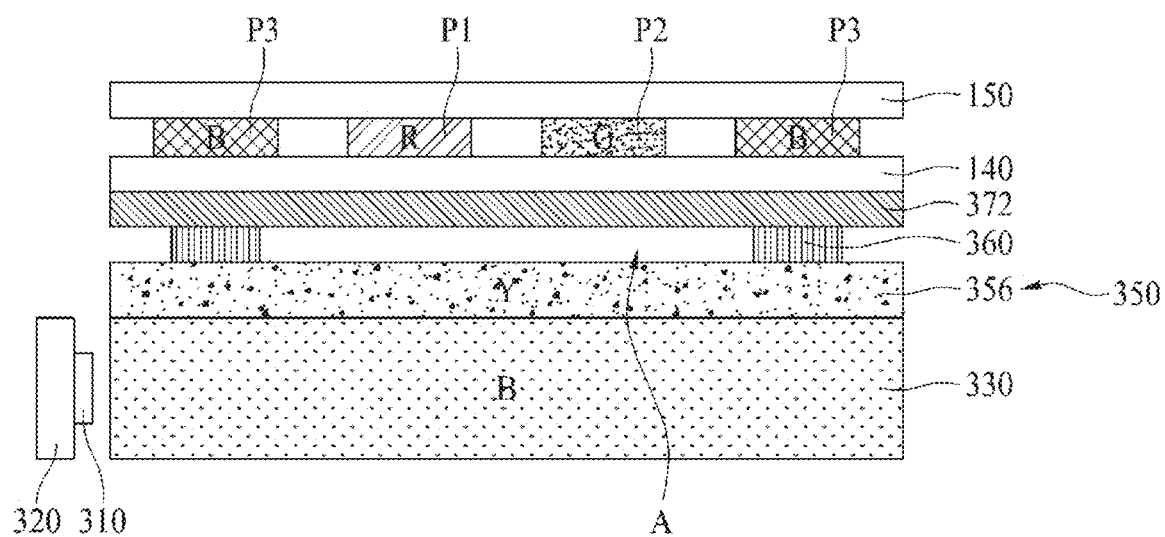
FIG. 11 is a schematic cross-sectional view illustrating a seventh embodiment of the color conversion layer and the adhesive layer.

FIG. 11 is a schematic cross-sectional view illustrating a seventh embodiment of the color conversion layer and the adhesive layer.

Referring to FIG. 11, a liquid crystal display device includes the display panel 100 and the backlight unit 300.

The backlight unit 300 includes the light sources 310, the light guide plate 330, a yellow color conversion layer 356, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the seventh embodiment of the present disclosure, on the light guide plate 330, the blue light may be incident from the blue LED. Accordingly, the light guide plate 330 allows the blue light to proceed toward the display panel 100.

The yellow color conversion layer 356 is formed on the light guide plate 330 to overlap a plurality of pixels P1, P2, and P3. The yellow color conversion layer 356 is disposed on a path of light which proceeds toward the display panel 100 from the light guide plate 330 and converts the blue light emitted by the light guide plate 330 into white light. In more detail, the yellow color conversion layer 356 includes a yellow light emitting material. The yellow light emitting material included in the yellow color conversion layer 356 collides with a part of the blue light and absorbs energy of the blue light. Accordingly, a wavelength of the part of the blue light is changed into that of yellow light, and the blue light and yellow light which has passed through the yellow color conversion layer 356 is mixed with each other and converted into white light.

The above-described yellow light emitting material includes, for example, a yellow phosphorescent material or a yellow fluorescent material and is mixed with a transparent resin material, such as a silicone resin, to form the yellow color conversion layer 356.

The prism sheet 372 condenses the white light, which is incident thereon, in a first direction. Here, the first direction may correspond to a major axis direction or a minor axis direction of the light guide plate 330.

The adhesive layer 360 is disposed between the yellow color conversion layer 356 and the prism sheet 372. The adhesive layer 360 is formed on a part of a top surface of the yellow color conversion layer 356 so as to allow the prism sheet 372 to adhere to the yellow color conversion layer 356 simultaneously while forming an air gap A between the yellow color conversion layer 356 and the prism sheet 372. Here, the adhesive layer 360 is formed to not overlap a G pixel P2 and an R pixel P1 such that the yellow light generated by the yellow color conversion layer 356 proceeds toward the G pixel P2 and the R pixel P1 without luminance reduction. That is, the adhesive layer 360 is formed to overlap a B pixel P3 as shown in FIG. 11.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the yellow color conversion layer 356 passes through the red color filter, blue light and green light are absorbed and red light is emitted. In the G pixel P2, as the white light generated by the yellow color conversion layer 356 passes through the green color filter, blue light and red light are absorbed and green light is emitted. In the B pixel P3, as the white light generated by the yellow color conversion layer 356 passes through the blue color filter, red light and green light are absorbed and blue light is emitted.

In the liquid crystal display device according to the seventh embodiment of the present disclosure, blue light is emitted by the light sources 310, and yellow light is generated by the yellow color conversion layer 356. That is, the liquid crystal display device may prevent a red light emitting material from absorbing green light by generating yellow light using the yellow light emitting material. Accordingly, in the liquid crystal display device according to the seventh embodiment of the present disclosure, the green light increases and a half width of a green peak increases, as shown in FIG. 12, such that luminance of light may be expected to increase.

Also, the liquid crystal display device according to the seventh embodiment of the present disclosure may prevent a light-condensing function of the prism sheet 372 from being degraded due to a scattering property caused by the yellow light emitting material of the yellow color conversion layer 356 by forming the air gap A between the yellow color conversion layer 356 and the prism sheet 372.

In addition, although it is assumed in FIG. 11 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a yellow color conversion layer.

Figure 13A:
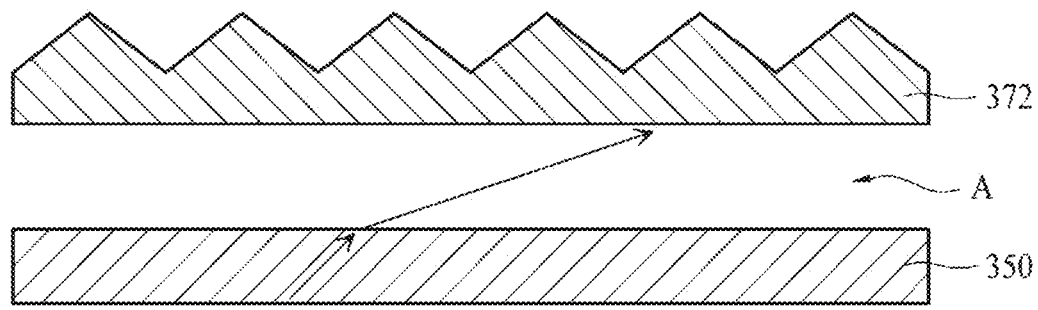
FIGS. 13A and 13B are views illustrating refraction of light depending on whether an air gap is present.
Figure 13B:
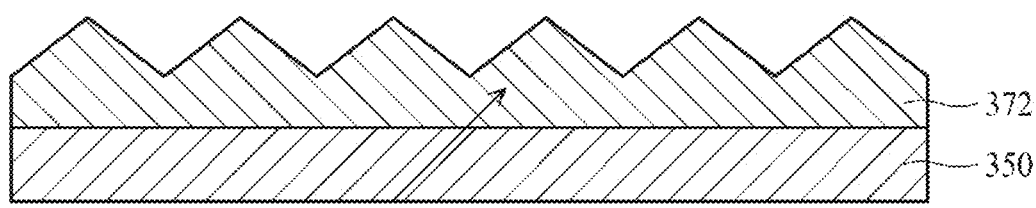
Figure 14A:
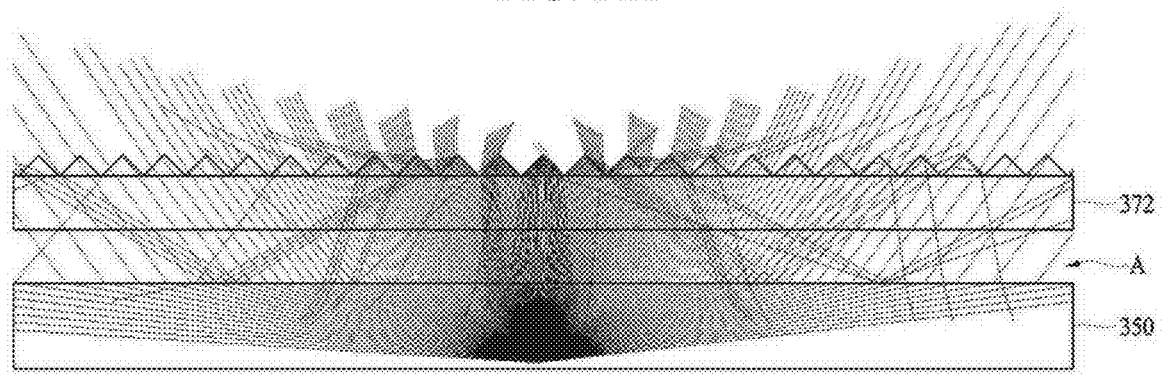
FIGS. 14A and 14B are views illustrating an optical path depending on whether an air gap is present.
Figure 14B:
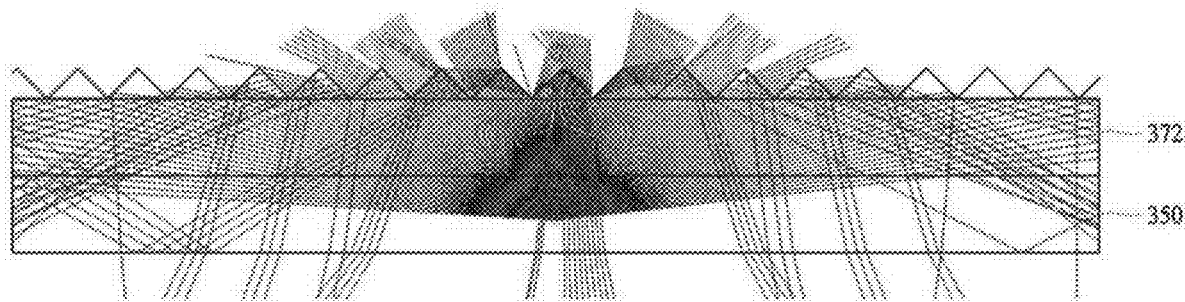

FIGS. 13A and 13B are views illustrating refraction of light depending on whether an air gap is present, and FIGS. 14A and 14B are views illustrating an optical path depending on whether an air gap is present.

FIG. 13A illustrates refraction of light when an air gap A is present between the color conversion layer 350 and the prism sheet 372. The light emitted by the color conversion layer 350 is refracted at a boundary between the color conversion layer 350 and the air gap according to Snell's law. Accordingly, light which is incident on the prism sheet 372 from the air gap A has less light with a beam spread angle of 90 degrees than that of in a case when the air gap A is not present.

FIG. 13B illustrates refraction of light when the air gap A is not present between the color conversion layer 350 and the prism sheet 372. Since the light emitted by the color conversion layer 350 is output by a light emitting material in a full range, more light is emitted with the light with the beam spread angle of 90 degrees than the case in which the air gap A is present.

Due to the above-described difference, luminance of light in a case when the air gap A is present between the color conversion layer 350 and the prism sheet 372 differs from that in a case when the air gap A is not present therebetween.

Referring to FIG. 14A, it may be seen that when the air gap A is present between the color conversion layer 350 and the prism sheet 372, less light, which is incident on the prism sheet 372 at an angle of 90 degrees and totally reflected, is emitted and most light is emitted toward the display panel.

On the other hand, referring to FIG. 14B, it may be seen that when the air gap A is not present between the color conversion layer 350 and the prism sheet 372, more light, which is incident on the prism sheet 372 at an angle of 90 degrees and totally reflected, is emitted and most light fails to be emitted toward the display panel and is incident on the color conversion layer 350 again.

Figures 15, 16:
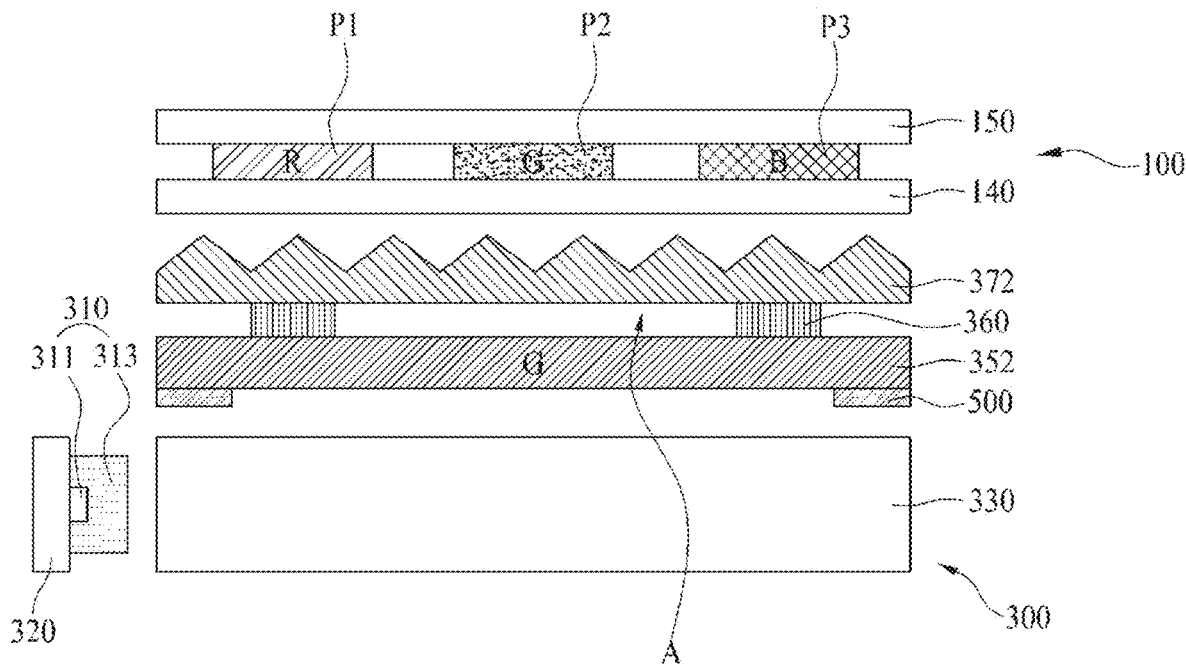
FIG. 15 is a view illustrating a difference in luminance depending on whether an air gap is present.
FIG. 16 is a schematic cross-sectional view illustrating an eighth embodiment of the color conversion layer and the adhesive layer.

As a result, according to the embodiment of the present disclosure, as the air gap A is formed between the color conversion layer 350 and the prism sheet 372, in comparison to a configuration in which the color conversion layer 350 and the prism sheet 372 are simply attached to each other without the air gap A therebetween, light increases such that luminance may be improved as shown in FIG. 15. In FIG. 15, PNL represents the panel, Ref represents a reference example, and No. 1 represents the invention example.

Eighth Embodiment

FIG. 16 is a schematic cross-sectional view illustrating an eighth embodiment of the color conversion layer and the adhesive layer.

Referring to FIG. 16, a liquid crystal display device includes the display panel 100 and the backlight unit 300.

Here, the display panel 100 may include one of a liquid crystal display (LCD) device, a plasma display panel (PDP), a field emission display (FED), an electroluminescence display (ELD), and an organic LED (OLED). An LCD device typically does not have its own light emitting element and has an additional light source.

Accordingly, the backlight unit 300 which includes a light source on a rear surface is provided and emits light toward a front surface of the display panel 100 formed of an LCD such that a recognizable image is embodied therethrough.

Although not shown in the drawing, in detail, the display panel 100 formed of an LCD includes the upper and lower substrates 110 and 120 (refer to FIG. 4) and a liquid crystal layer interposed between the two substrates 110 and 120. The backlight unit 300 is provided therebehind.

Here, the lower substrate 110 includes a plurality of gate lines which are formed on an inside of the lower substrate 110 to be spaced at certain intervals apart in parallel and data lines which overlap with the gate lines to form pixel areas. A TFT is formed at each of intersections of pixels P1, P2, and P3 where the gate lines and the data line overlap each other. In each pixel area, a plurality of pixel electrodes are connected to the TFT through drain contact holes and include a transparent conductive material.

The TFT includes a gate electrode, a gate insulator film, a semiconductor layer, and source and drain electrodes.

Here, the pixel electrode includes a plurality of bars separated and spaced apart in each of the pixels P1, P2, and P3. Also, a common line is formed to be flush with the gate line, and a plurality of common electrodes, which are electrically connected to the common line and alternately spaced apart from the plurality of pixel electrodes separated in the pixels P1, P2, and P3, are formed.

Here, as another example, the pixel electrode may have a plate shape and be formed for each of the pixels P1, P2, and P3. Here, a part of the pixel electrode may be configured to overlap the gate line so as to form a storage capacitor.

Also, when the plurality of pixel electrodes and the common electrodes are formed to be spaced apart in each of the pixels P1, P2, and P3, the lower substrate 110, which operates in an IPS mode, is formed. When the pixel electrode having a plate shape is formed on the lower substrate 110 without the common electrode, the lower substrate 110 which operates in any one of a TN mode, an ECB mode, and a VA mode is formed.

Also, an inner surface of the upper substrate 120, which faces the lower substrate 110, includes color filters having colors, for example, R, G, and B corresponding to the pixels P1, P2, and P3 and a black matrix which surrounds each of them and hides non-display elements such as the gate line, the data line, the TFT, and the like.

That is, there are included an R pixel P1 which includes a red color filter, a G pixel P2 which includes a green color filter, and a B pixel P3 which includes a blue color filter.

Here, the red color filter includes red color which transmits light having a red wavelength and absorbs light having other wavelengths. Also, the green color filter includes green color which transmits light having a green wavelength and absorbs light having other wavelengths. The blue color filter includes blue color which transmits light having a blue wavelength and absorbs light having other wavelengths.

The upper polarizing plate 150 is attached to the upper substrate 120 of the display panel 100, and the lower polarizing plate 140 is attached to the lower substrate 110. A light transmission axis of the upper polarizing plate 150 intersects with, or crosses a light transmission axis of the lower polarizing plate 140. Also, an alignment film for setting a pre-tilt angle of liquid crystals may be formed on inner surfaces of the upper substrate 120 and the lower substrate 110 that are in contact with the liquid crystals.

Also, the backlight unit 300 which supplies light to the display panel 100 is provided such that the backlight unit 300 refracts light of a light source which is emitted from one surface behind the lower substrate 110 toward the glass light guide plate 330 to allow the light to be incident on the display panel 100.

The backlight unit 300 includes the light sources 310 formed of a plurality of light emitting diodes (hereinafter, referred to as LEDs), the glass light guide plate 330, the green color conversion layer 352, the adhesive layer 360, and the prism sheet 372.

Here, in the liquid crystal display device according to the eighth embodiment, the light guide plate 330 of the backlight unit 300 is formed of a glass material.

That is, among components of the backlight unit 300, the light guide plate is generally manufactured using a light-transmitting plastic material, such as poly(methyl methacrylate) (PMMA), a methyl styrene (MS) resin, poly styrene (PS), poly propylene (PP), polyethylene terephthalate (PET), and polycarbonate (PC). Typically, a light guide plate formed of a PMMA material is used.

However, such plastic light guide plates have high light transmittance but should have a certain thickness or more for maintaining certain strength and the like and have a high heat expansion rate and well humidity swelling.

Accordingly, display devices, in which a light guide plate formed of plastic, such as PMMA, PC, PS, and the like is used, have disadvantages such as a limitation in decreasing in a thickness, a limitation in arrangement of the light guide plate and a light source portion, and a utilization of an additional support structure, and the like.

To overcome disadvantages of plastic light guide plates, in the eighth embodiment of the present disclosure, the glass light guide plate 330 formed of a glass material is used as a light guide plate used in the backlight unit 300.

The glass light guide plate 330 has an advantage in having a small thickness due to high hardness thereof, which allows for decreasing a thickness of a display device and has low heat expansion and low humidity swelling, in comparison to a plastic light guide plate.

Each of the plurality of LEDs 310 which emits light toward an inside of the glass light guide plate 330 is mounted on the LED PCB 320 to form an LED assembly. The LED assembly is fixed through adhesion and the like such that light is emitted by the plurality of LEDs 310 to face a light entrance surface of the glass light guide plate 330.

Accordingly, the light emitted from each of the LEDs 310 is incident on the light entrance surface of the light guide plate 330, refracted therein toward the display panel 100, treated as a high-quality surface light source while passing through the green color conversion layer 352 and the prism sheet 372 with the light being reflected by the reflection sheet 340 and supplied to the display panel 100.

Here, each of the plurality of LEDs 310 is formed as a magenta LED which includes a blue LED chip 311, which emits blue light, and a red fluorescent body 313, which is applied to a top of the blue LED chip 311.

That is, blue light emitted by the blue LED chip 311 is mixed with red light emitted by the red fluorescent body 313 such that magenta light exits outward.

The glass light guide plate 330 converts light emitted from the light sources 310 into a surface light source and emits the light toward the display panel 100.

In the eighth embodiment of the present disclosure, the magenta light, in which blue light and red light are mixed, is incident on the glass light guide plate 330. Accordingly, the glass light guide plate 330 allows the magenta light to proceed toward the display panel 100.

The green color conversion layer 352 is formed on the glass light guide plate 330 to overlap a plurality of pixels P1, P2, and P3. The green color conversion layer 352 is disposed on a path of light which proceeds toward the display panel 100 from the glass light guide plate 330 and converts the magenta light emitted by the glass light guide plate 330 into white light.

In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which has passed through the green color conversion layer 352 is mixed with each other and converted into white.

The above-described green light emitting material includes, for example, a green phosphorescent material or a green fluorescent material and is mixed with a transparent resin material, such as a silicone resin, to form the green color conversion layer 352.

The prism sheet 372 located above the green color conversion layer 352 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372.

The adhesive layer 360 is formed on a portion of a top surface of the green color conversion layer 352 so as to allow the prism sheet 372 to adhere to the green color conversion layer 352 simultaneously while forming an air gap A between the green color conversion layer 352 and the prism sheet 372.

Here, the adhesive layer 360 is formed to not overlap the G pixel P2 such that the green light generated by the green color conversion layer 352 proceeds toward the G pixel P2 without luminance reduction. That is, the adhesive layer 360 is formed to overlap the R pixel P1 and the B pixel P3.

Accordingly, in the liquid crystal display device according to the present disclosure, in the R pixel P1, as the white light generated by the green color conversion layer 352 passes through the red color filter, blue light and green light are absorbed and red light is emitted.

Also, in the G pixel P2, as the white light generated by the green color conversion layer 352 passes through the green color filter, the blue light and red light are absorbed and the green light is emitted. In the B pixel P3, as the white light generated by the green color conversion layer 352 passes through the blue color filter, red light and green light are absorbed and blue light is emitted.

In the liquid crystal display device according to the eighth embodiment of the present disclosure, the magenta light is emitted by the light sources 310 and the green light is generated by the green color conversion layer 352. That is, since the red light and the green light are spatially separated and the red light is generated first and then the green light is generated, the liquid crystal display device prevents a red light emitting material from absorbing the green light.

Accordingly, in the liquid crystal display device according to present disclosure, the green light increases and a half width of a green peak increases, as shown in FIG. 12, such that luminance of light may be expected to increase.

Further, the liquid crystal display device according to the present disclosure may also prevent a light-condensing function of the prism sheet 372 from being degraded due to a scattering property caused by the green light emitting material of the green color conversion layer 352 by forming the air gap A between the green color conversion layer 352 and the prism sheet 372.

That is, luminance of light in a case when the air gap A is present between the green color conversion layer 352 and the prism sheet 372 differs from that in a case when the air gap A is not present therebetween. When the air gap A is present between the green color conversion layer 352 and the prism sheet 372, less light, which is incident on the prism sheet 372 at an angle of 90 degrees and totally reflected, is emitted and most light is emitted toward the display panel.

On the other hand, when the air gap A is not present between the green color conversion layer 352 and the prism sheet 372, more light, which is incident on the prism sheet 372 at an angle of 90 degrees and totally reflected, is emitted and most light fails to be emitted toward the display panel and is incident on the green color conversion layer 352 again.

In other words, it may be seen that when the air gap A is formed between the green color conversion layer 352 and the prism sheet 372, in comparison to a configuration in which the green color conversion layer 352 and the prism sheet 372 are simply attached to each other without the air gap A therebetween, a quantity of light increases such that luminance may be improved.

In addition, in the liquid crystal display device, the magenta light, which has been incident on the inside of the glass light guide plate 330, is transmitted through the green color conversion layer 352, and due to low excitation efficiency at edges of the green color conversion layer 352, an edge light leak occurs along edges of the liquid crystal display device due to a part of a magenta bright line which is not converted in color.

Here, since light, which passes through and exits from the prism sheet 372, is white light, even when a light leak occurs, there is no great influence on visual sensation. However, since most light, which exits from the green color conversion layer 352 and the glass light guide plate 330, is magenta light, the edge light leak caused by the magenta bright line which leaks at edges is a main cause of degradation in screen quality of the liquid crystal display device.

Accordingly, the liquid crystal display device according to the eighth embodiment of the present disclosure includes a fluorescent pattern 500 along edges of a bottom surface thereof which faces a rear surface of the green color conversion layer 352, that is, the glass light guide plate 330.

It is possible to prevent the edge light leak which occurs at the edges of the liquid crystal display device by using the fluorescent pattern 500 provided along the edges of the bottom surface of the green color conversion layer 352.

The fluorescent pattern 500 is formed of green organic fluorescent dye with a maximum light emitting wavelength within a range from 500 to 550 nm and converts the magenta light, which is incident from the LED 310 that is a light source, into white light.

Here, a boron-dipyrromethene (BODIPY)-based dye, an acridine-based dye, a xanthene-based dye, an arylmethane-based dye, a coumarin-based dye, a polycyclic aromatic hydrocarbons-based dye, a polycyclic heteroaromatic-based dye, a perylene dye, a pyrrole-based dye, a pyrene derivatives-based dye, and the like may be used as the green organic fluorescent dye. The above materials are merely an example of an organic fluorescent dye, and a variety of green organic fluorescent dyes may be used in addition thereto.

In comparison to inorganic fluorescent dyes or nano crystal fluorescent bodies, the green organic fluorescent dye has advantages such as a light emitting wavelength which is easily adjustable to a desired level, a light emitting line width capable of obtaining excellent color gamut, and low costs.

As described above, the fluorescent pattern 500 formed of the green organic fluorescent dye is provided along the edges of the bottom surface of the green color conversion layer 352 such that magenta light, which is incident on the edges of the green color conversion layer 352, is absorbed by the fluorescent pattern 500 and converted into white light.

Through this, it is possible to overcome the low excitation efficiency at the edges of the green color conversion layer 352 such that the edge light leak caused by the part of the magenta bright line which is not converted in color may be prevented from occurring along the edges of the liquid crystal display device.

Accordingly, finally, it is possible to prevent screen quality of the liquid crystal display device from being degraded by the edge light leak caused by the magenta bright line which leaks at the edges of the liquid crystal display device.

In addition, as the fluorescent pattern 500 provided along the edges of the bottom surface of the green color conversion layer 352 has a larger width, the excitation efficiency at the edges of the green color conversion layer 352 may be further improved. However, when the fluorescent pattern 500 is formed inside an active area of the display panel 100 in which an image is embodied, since the fluorescent pattern 500 itself may be visually recognized or a light leak caused by the fluorescent pattern 500 may occur, the width of the fluorescent pattern 500 may correspond only to a space from an end of the edge of the green color conversion layer 352 to a boundary of the active area.

Also, the fluorescent pattern 500 may be provided on an overall rear surface of the green color conversion layer 352 along four edges of the green color conversion layer 352, which includes the light entrance portion in which the light sources 310 are located. Since the light entrance portion in which the light sources 310 are located has a wider bezel than those of other areas, the fluorescent pattern 500 may be provided on the bottom surface of the green color conversion layer 352 along three edges except for the area of the light entrance portion.

As described above, in the liquid crystal display device according to the eighth embodiment of the present disclosure, since the backlight unit 300 includes the LEDs 310 which emit magenta light and the green color conversion layer 352, green light and red light are spatially separated such that the green light and a half width of a green peak increase and luminance of light also increases. Also, the light guide plate 330 is formed of a glass material such that the liquid crystal display device may be embodied to be thin while having advantages in reducing heat expansion and humidity swelling.

Also, since the air gap A is formed between the green color conversion layer 352 and the prism sheet 372, it is possible to also prevent a light-condensing function of the prism sheet 372 from being degraded due to a scattering property caused by a green light emitting material of the green color conversion layer 352, so as to further increase the luminance.

Also, since the fluorescent pattern 500 formed of the green organic fluorescent dye is provided along the edges of the bottom surface of the green color conversion layer 352, it is possible to prevent the edge light leak from occurring along the edges of the liquid crystal display device such that the screen quality of the liquid crystal display device may be prevented from being degraded.

Ninth Embodiment

Figure 17:
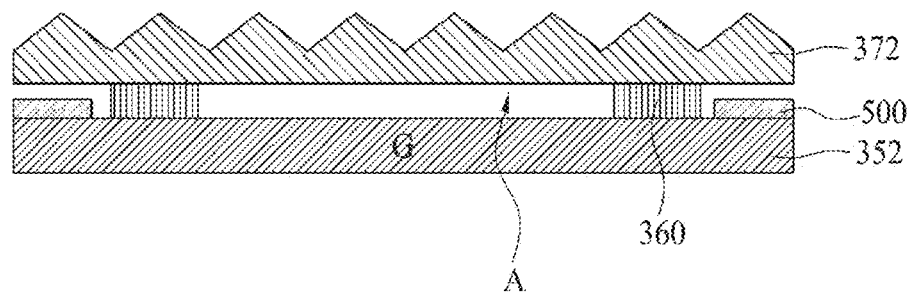
FIG. 17 is a schematic cross-sectional view illustrating a ninth embodiment of the color conversion layer and the adhesive layer.

FIG. 17 is a schematic cross-sectional view illustrating a ninth embodiment of the color conversion layer and the adhesive layer. In FIG. 17, the liquid crystal display device shown in FIG. 16 may include the fluorescent pattern 500 provided along edges of a top surface of the green color conversion layer 352 which faces the prism sheet 372.

The fluorescent pattern 500 provided along the edges of the top surface of the green color conversion layer 352 overcomes the low excitation efficiency at the edges of the green color conversion layer 352 such that an edge light leak may be prevented from occurring along edges of the liquid crystal display device.

Since other components are substantially similar to those of FIG. 16, a description thereof will be omitted.

Tenth Embodiment

Figure 18:
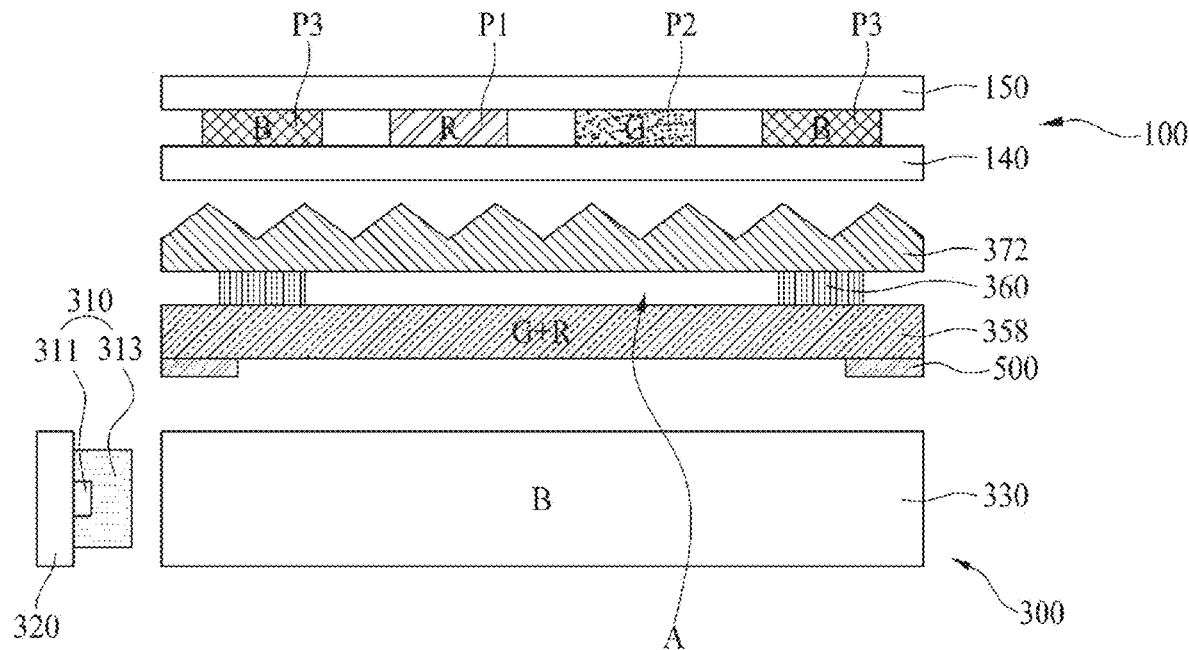
FIG. 18 is a schematic cross-sectional view illustrating a tenth embodiment of the color conversion layer and the adhesive layer.

FIG. 18 is a schematic cross-sectional view illustrating a tenth embodiment of the color conversion layer and the adhesive layer. In FIG. 18, the liquid crystal display device shown in FIG. 6 includes the fluorescent pattern 500 provided along edges of a bottom surface of the mixed color conversion layer 358.

The fluorescent pattern 500 is formed, for example, by mixing one or more types of a green organic fluorescent dye which has a maximum light emitting wavelength within a range from 500 to 550 nm with one or more types of a red organic fluorescent dye which has a maximum light emitting wavelength within a range from 600 to 660 nm and converts blue light, which is incident thereon from the LEDs 310 which are light sources, into white light.

Here, although the green organic fluorescent dye and the red organic fluorescent dye are not particularly limited, a boron-dipyrromethene (BODIPY)-based dye, an acridine-based dye, a xanthene-based dye, an arylmethane-based dye, a coumarin-based dye, a polycyclic aromatic hydrocarbons-based dye, a polycyclic heteroaromatic-based dye, a perylene dye, a pyrrole-based dye, a pyrene derivatives-based dye, and the like may be used as the green organic fluorescent dye and the red organic fluorescent dye. The above materials are merely an example of an organic fluorescent dye, and varieties of green organic fluorescent dyes and red organic fluorescent dyes may be used in addition thereto.

In comparison to inorganic fluorescent dyes or nano crystal fluorescent bodies, the green and red organic fluorescent dyes have advantages, such as a light emitting wavelength which is easily adjustable to be a desired level, a light emitting line width capable of obtaining excellent color gamut, and low costs.

As described above, the fluorescent pattern 500 formed of the green and red organic fluorescent dyes is provided along the edges of the bottom surface of the mixed color conversion layer 358 such that blue light, which is incident on the edges of the mixed color conversion layer 358, is absorbed by the fluorescent pattern 500 and is converted into white light.

Through this, it is possible to overcome the low excitation efficiency at the edges of the mixed color conversion layer 358 such that an edge light leak caused by a part of a blue bright line which is not converted in color may be prevented from occurring along edges of the liquid crystal display device.

Finally, it is therefore possible to prevent screen quality of the liquid crystal display device from being degraded by the edge light leak caused by the blue bright line which leaks at the edges of the liquid crystal display device.

Figure 19A:
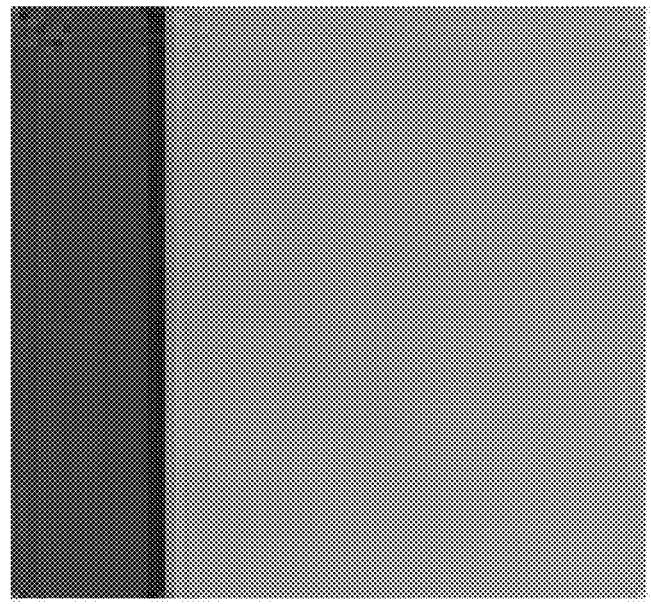
FIGS. 19A and 19B are photos illustrating shapes in which edge light leaks occur at edges of a liquid crystal display device and which are measured and compared.

FIG. 19A is a photo illustrating a shape in which an edge light leak occurs at edges of a liquid crystal display device. Here, it may be seen that the edge light leak is a blue bright line which is bluish.

Figure 19B:
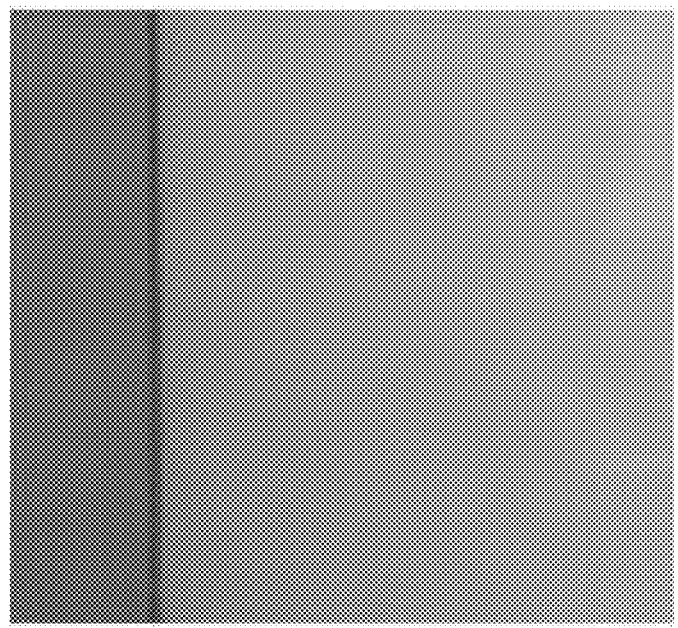

On the other hand, referring to FIG. 19B, it may be seen that an edge light leak does not occur the edges of the liquid crystal display device according to the tenth embodiment of the present disclosure.

In other words, it may be seen that the liquid crystal display device according to the tenth embodiment of the present disclosure includes the fluorescent pattern 500 which is formed of the green and red organic fluorescent dyes and provided along the edges of the bottom surface of the mixed color conversion layer 358 such that the low excitation efficiency at the edges of the mixed color conversion layer 358 may be overcome by the fluorescent pattern 500.

Through this, it may be also seen that the edge light leak caused by the blue bright line may be prevented from occurring along the edges of the liquid crystal display device.

Figure 20:
FIG. 20 is a schematic cross-sectional view illustrating shapes of the color conversion layer and a fluorescent pattern.

Meanwhile, in the liquid crystal display devices according to the eighth embodiment to the tenth embodiment of the present disclosure, it has been described as an example that the fluorescent pattern 500 provided along the edges of the bottom surface or the top surface of the green color conversion layer 352 or the mixed color conversion layer 358 is formed through a printing process such as screen print, offset print, and the like. However, the fluorescent pattern 500 may be provided by bending the edges of the green color conversion layer 352 as shown in FIG. 20.

Eleventh Embodiment

Figure 21:
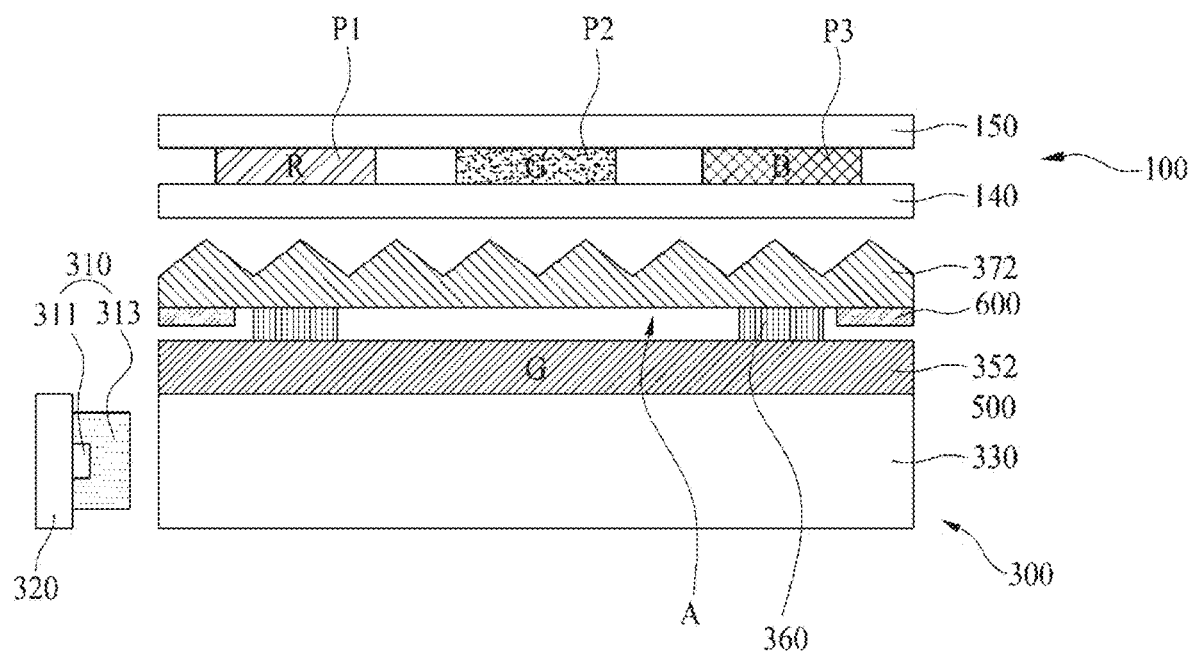
FIG. 21 is a schematic cross-sectional view illustrating an eleventh embodiment of the color conversion layer and the adhesive layer.

FIG. 21 is a schematic cross-sectional view illustrating an eleventh embodiment of the color conversion layer and the adhesive layer.

Referring to FIG. 21, a liquid crystal display device includes the display panel 100 and the backlight unit 300.

Here, since components of the display panel 100 are substantially similar to those of FIG. 16, a description thereof will be omitted.

The backlight unit 300 which supplies light to the display panel 100 refracts light of a light source which exits from one surface behind the lower substrate 110 (refer to FIG. 4) toward the glass light guide plate 330 to allow the light to be incident on the display panel 100.

The backlight unit 300 includes the light sources 310 formed of a plurality of LEDs, the glass light guide plate 330, the green color conversion layer 352, the adhesive layer 360, and the prism sheet 372.

Here, in the liquid crystal display device according to the eleventh embodiment of the present disclosure, the light guide plate 330 of the backlight unit 300 may be formed of a glass material.

Since the glass light guide plate 330 has excellent hardness in comparison to a plastic light guide plate so as to allow a decrease in a thickness thereof, there are advantages such as decreasing a thickness of the display device, a low heat expansion property, and a low humidity swelling property.

Here, each of the plurality of LEDs 310 which emit light toward an inside of the glass light guide plate 330 is mounted on the LED PCB 320 and forms an LED assembly. The LED assembly is fixed using a method such as adhesion and the like such that light, which is emitted from each of the plurality of LEDs 310, faces a light entrance surface of the light guide plate 330.

Accordingly, the light emitted from each of the LEDs 310 is incident on the light entrance surface of the light guide plate 330, is refracted therein toward the display panel 100, is treated as a uniform high-quality surface light source while passing through the green color conversion layer 352 and the prism sheet 372 with light reflected by the reflection sheet 340 (refer to FIG. 4), and is supplied to the display panel 100.

Here, each of the plurality of LEDs 310 is formed as a magenta LED which includes the blue LED chip 311 which emits blue light and the red fluorescent body 313 which is applied to a top of the blue LED chip 311.

That is, the blue light emitted by the blue LED chip 311 is mixed with red light emitted by the red fluorescent body 313 such that magenta light exits outward.

The glass light guide plate 330 converts light emitted from the light sources 310 into a surface light source and emits the light toward the display panel 100.

In the eleventh embodiment of the present disclosure, the magenta light in which blue light and red light are mixed is incident on the glass light guide plate 330. Accordingly, the glass light guide plate 330 allows the magenta light to proceed toward the display panel 100.

The green color conversion layer 352 is formed on the glass light guide plate 330 to overlap a plurality of pixels P1, P2, and P3. The green color conversion layer 352 is disposed on a path of light which proceeds toward the display panel 100 from the glass light guide plate 330 and converts the magenta light emitted by the light guide plate 330 into white light.

In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which has passed through the green color conversion layer 352 is mixed with each other and converted into white.

The above-described green light emitting material includes a green phosphorescent material or a green fluorescent material and is mixed with a transparent resin material such as a silicone resin to form the green color conversion layer 352.

The prism sheet 372 located above the green color conversion layer 352 condenses light, which is incident thereon, in a first direction. Here, the first direction may correspond to a major axis direction or a minor axis direction of the glass light guide plate 330.

The adhesive layer 360 is disposed between the green color conversion layer 352 and the prism sheet 372.

The adhesive layer 360 is formed on a portion of a top surface of the green color conversion layer 352 so as to allow the prism sheet 372 to adhere to the green color conversion layer 352 simultaneously while an air gap A is formed between the green color conversion layer 352 and the prism sheet 372.

Here, the adhesive layer 360 is formed to not overlap the G pixel P2 such that the green light generated by the green color conversion layer 352 proceeds toward the G pixel P2 without luminance reduction. That is, the adhesive layer 360 is formed to overlap the R pixel P1 and the B pixel P3.

Accordingly, in the liquid crystal display device according to the present disclosure, in the R pixel P1, as the white light generated by the green color conversion layer 352 passes through the red color filter, blue light and green light are absorbed and red light is emitted.

Also, in the G pixel P2, as the white light generated by the green color conversion layer 352 passes through the green color filter, blue light and red light are absorbed and green light is emitted. In the B pixel P3, as the white light generated by the green color conversion layer 352 passes through the blue color filter, red light and green light are absorbed and blue light is emitted.

In the liquid crystal display device according to the eleventh embodiment of the present disclosure, the magenta light is emitted by the light sources 310, and the green light is generated by the green color conversion layer 352. That is, since red light and green light are spatially separated and the red light is generated first followed by generation of the green light, the liquid crystal display device prevents a red light emitting material from absorbing the green light.

Accordingly, in the liquid crystal display device according to the present disclosure, the green light increases and a half width of a green peak increases as shown in FIG. 12 such that luminance of light may be expected to increase.

Also, the liquid crystal display device according to the present disclosure may also prevent a light-condensing function of the prism sheet 372 from being degraded due to a scattering property caused by the green light emitting material of the green color conversion layer 352 by forming the air gap A between the green color conversion layer 352 and the prism sheet 372.

That is, luminance of light differs depending on whether the air gap A is present between the green color conversion layer 352 and the prism sheet 372. When the air gap A is present between the green color conversion layer 352 and the prism sheet 372, less light is incident on and totally reflected by the prism sheet 372 at an angle of 90 degrees and most light exits toward the display panel.

On the other hand, when the air gap A is not present between the green color conversion layer 352 and the prism sheet 372, more light is incident on and totally reflected by the prism sheet 372 at an angle of 90 degrees and most light fails to exit toward the display panel and is incident on the green color conversion layer 352 again.

In other words, it may be seen that when the air gap A is formed between the green color conversion layer 352 and the prism sheet 372, in comparison to a configuration in which the green color conversion layer 352 and the prism sheet 372 are simply attached to each other without the air gap A therebetween, a quantity of light increases such that luminance may be improved.

Meanwhile, the liquid crystal display device according to the eleventh embodiment of the present disclosure may include a white pattern 600 along edges of a rear surface of the prism sheet 372 located above the green color conversion layer 352, that is, a bottom surface thereof which faces the green color conversion layer 352.

Through this, the edge light leak caused by a part of the magenta bright line which is not converted, due to the low excitation efficiency at the edges of the green color conversion layer 352 in color may be prevented from occurring along the edges of the liquid crystal display device.

The white pattern 600 provided along the edges of the rear surface of the prism sheet 372 reflects light which is transmitted through the edges of the green color conversion layer 352 to allow the light to be incident on the green color conversion layer 352 again such that the light is recycled at an edge area of the green color conversion layer 352.

Through this, it is possible to prevent light which is not converted in color from being transmitted through the edges of the green color conversion layer 352.

The white pattern 600 may be formed by applying a white dye to the edges of the rear surface of the prism sheet 372 through a printing process such as screen print, offset print, and the like.

As described above, the white pattern 600 is provided along the edges of the bottom surface of the prism sheet 372 such that magenta light which is not converted in color among light which is transmitted through the green color conversion layer 352 is reflected by white pattern 600 toward the green color conversion layer 352 to be incident thereon again.

The magenta light which is incident on the green color conversion layer 352 again is converted into white light by the green color conversion layer 352 and exits toward the display panel 100.

Through this, it is possible to overcome the low excitation efficiency at the edges of the green color conversion layer 352 such that the edge light leak caused by a part of a magenta bright line which is not converted in color may be prevented from occurring along the edges of the liquid crystal display device.

Finally, it is therefore possible to prevent screen quality of the liquid crystal display device from being degraded by the edge light leak caused by the magenta bright line which leaks at the edges of the liquid crystal display device.

Particularly, the liquid crystal display device according to the eleventh embodiment of the present disclosure includes the white pattern 600 provided along the edges of the rear surface of the prism sheet 372 such that the edge light leak at the edges of the green color conversion layer 352 which is caused by the magenta bright line which is not converted in color may be prevented simultaneously while the light, which is not converted in color, is incident on the green color conversion layer 352 again so as to further improve luminance.

As described above, in the liquid crystal display device according to the eleventh embodiment of the present disclosure, since the backlight unit 300 includes the LEDs 310 which emit magenta light and the green color conversion layer 352, green light and red light are spatially separated such that the green light and a half width of a green peak increase and luminance of light also increases. Also, the light guide plate 330 is formed of a glass material such that the liquid crystal display device may be embodied to be thin while having advantages in reducing heat expansion and humidity swelling.

Also, since the air gap A is formed between the green color conversion layer 352 and the prism sheet 372, it is possible to prevent a light-condensing function of the prism sheet 372 from being degraded due to a scattering property caused by a green light emitting material of the green color conversion layer 352, so as to further increase the luminance.

Also, the white pattern 600 is provided along the edges of the bottom surface of the prism sheet 372 located above the green color conversion layer 352 such that light is recycled in the edge area of the green color conversion layer 352. Through this, it is possible to prevent occurrence of the edge light leak along the edges of the liquid crystal display device.

Finally, it is therefore possible to prevent screen quality of the liquid crystal display device from being degraded by the edge light leak caused by the magenta bright line which leaks at the edges of the liquid crystal display device.

In addition, in the liquid crystal display devices according to the eighth to eleventh embodiments of the present disclosure, since the light guide plate 330 is formed of a glass material, a light entrance surface and an opposing light entrance surface or a side surface (hereinafter, referred to as the side surface) of the glass light guide plate 330 are formed to be coarse.

Figure 22A:
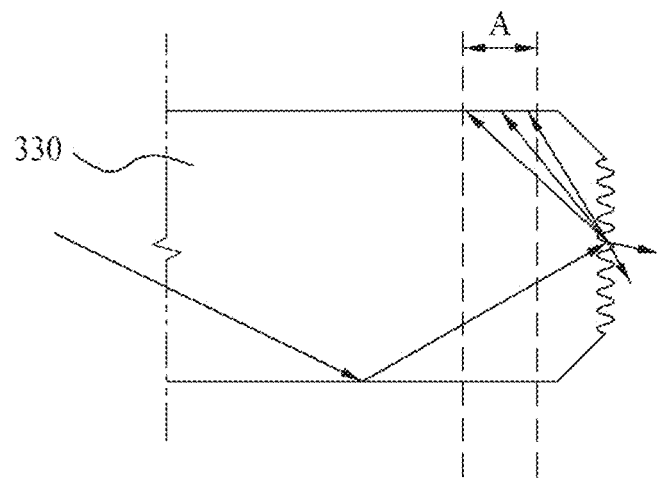
FIGS. 22A and 22B are views illustrating shapes in which diffuse reflection occurs from side surfaces of a general light guide plate and a glass light guide plate and which are measured and compared.

As described above, when the side surface of the glass light guide plate 330 is formed to be coarse, light, which is totally reflected in the glass light guide plate 330, is irregularly reflected by the side surface of the glass light guide plate 330 and exits through an area A in which a bright line occurs such that an edge light leak may occur at the edges of the liquid crystal display device, as shown in FIG. 22A.

Figure 22B:
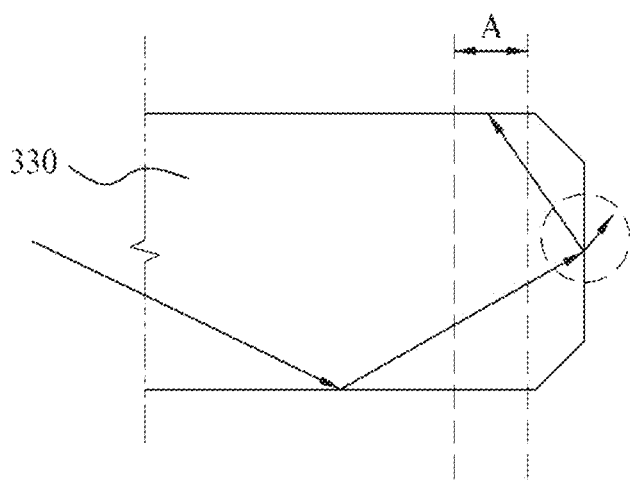

Accordingly, the liquid crystal display devices according to the eighth to eleventh embodiments of the present disclosure may minimize irregular reflection caused by the side surface of the glass light guide plate 330 by decreasing roughness of the side surface of the glass light guide plate 330 as shown in FIG. 22B.

Through this, it is possible to prevent the edge light leak caused by the side surface of the glass light guide plate 330 from occurring at the edges of the liquid crystal display device.

As described above, according to the embodiments of the present disclosure, since a green color conversion layer which converts blue light into green light is additionally included, red color and green color may be spatially separated such that it is possible to prevent a red light emitting material from absorbing the green light as much as an area A in which a green light emitting area overlaps a red color absorption area. As a result, according to the embodiments, the green light increases such that luminance and color reproduction may be improved.

According to the embodiments, an air gap is formed between a color conversion layer and a prism sheet such that light which is perpendicularly incident on the prism sheet may be reduced. Accordingly, light which is incident on the prism sheet may be prevented from being totally reflected, and luminance may be increased by emitting most light toward a display panel.

According to the embodiments, since an adhesive layer is formed to not overlap a green pixel, the green light may be incident on the display panel without a loss such that light efficiency may be increased.

Also, a light guide plate is formed of a glass material such that the liquid crystal display device may be embodied to be thin while having advantages in reducing heat expansion and humidity swelling. A fluorescent pattern is provided along edges of a bottom surface or a top surface of the green color conversion layer or a white pattern is provided along edges of a bottom surface of the prism sheet such that an effect of preventing an edge light leak from occurring along edges of the liquid crystal display device is present.

Although the embodiments of the present disclosure have been described above in more detail with reference to the attached drawings, the present disclosure is not limited to the above embodiments and a variety of modifications thereof may be made without departing from the technical concept of the present disclosure.

Accordingly, the embodiments disclosed herein are not intended to limit but explain the technical concept of the present disclosure, and the scope of the present disclosure should not be limited by the above embodiments.

Therefore, the above-described embodiments should be understood to be exemplary and not limiting in every aspect.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid crystal display device, comprising:
a display panel including a red pixel, a green pixel, and a blue pixel; and
a backlight unit configured to emit light to the display panel, the backlight unit including:
 a light source configured to output a first color light;
 a color conversion layer configured to convert the first color light into a second color light;
 an optical sheet configured to diffuse the second color light;
 an adhesive layer between the color conversion layer and the optical sheet, the adhesive layer not overlapping the green pixel; and
 an air gap between the color conversion layer and the optical sheet.

2. The liquid crystal display device of claim 1, wherein the first color light includes blue light, and the second color light includes green light.

3. The liquid crystal display device of claim 2, wherein the color conversion layer includes a mixed color conversion layer, the mixed color conversion layer includes a red light emitting material and a green light emitting material, the red light emitting material is configured to convert the blue light into red light, and the green light emitting material is configured to convert the blue light into the green light.

4. The liquid crystal display device of claim 2, wherein the color conversion layer includes:
   a red color conversion layer overlapping the red pixel, the red color conversion layer including a red light emitting material configured to convert the blue light into red light; and
   a green color conversion layer flush with the red color conversion layer and overlapping the green pixel, the green color conversion layer including a green light emitting material configured to convert the blue light into the green light.

5. The liquid crystal display device of claim 2, wherein the first color light further includes red light, and the color conversion layer includes a green color conversion layer configured to convert a part of the blue light into the green light.

6. The liquid crystal display device of claim 5, wherein the green color conversion layer overlaps the green pixel.

7. The liquid crystal display device of claim 5, wherein a fluorescent pattern is provided along edges of a bottom surface or a top surface of the green color conversion layer.

8. The liquid crystal display device of claim 7, wherein the fluorescent pattern includes a green organic fluorescent dye.

9. The liquid crystal display device of claim 7, wherein the fluorescent pattern has a width corresponding to a space from an end of the edge of the green color conversion layer to a boundary of an active area of the display panel.

10. The liquid crystal display device of claim 7, wherein the fluorescent pattern is provided along edges of the green color conversion layer except for one edge corresponding to a light entrance portion in which the light source is located.

11. The liquid crystal display device of claim 7, wherein the fluorescent pattern is formed by bending edges of the green color conversion layer.

12. The liquid crystal display device of claim 2, wherein the color conversion layer includes a yellow color conversion layer configured to convert a part of the blue light into yellow light.

13. The liquid crystal display device of claim 1 wherein the adhesive layer overlaps the blue pixel.

14. The liquid crystal display device of claim 3, wherein a fluorescent pattern is provided along edges of a bottom surface or a top surface of the mixed color conversion layer.

15. The liquid crystal display device of claim 14, wherein the fluorescent pattern includes green and red organic fluorescent dyes.

16. The liquid crystal display device of claim 14, wherein the fluorescent pattern has a width corresponding to a space from an end of the edge of the mixed color conversion layer to a boundary of an active area of the display panel.

17. The liquid crystal display device of claim 14, wherein the fluorescent pattern is provided along edges of the mixed color conversion layer except for one edge corresponding to a light entrance portion in which the light source is located.

18. The liquid crystal display device of claim 14, wherein the fluorescent pattern is formed by bending edges of the mixed color conversion layer.

19. The liquid crystal display device of claim 1, wherein a white pattern is provided on a bottom surface of the optical sheet along edges thereof.

20. The liquid crystal display device of claim 19, wherein the white pattern has a width corresponding to a space from an end of an edge of the optical sheet to a boundary of an active area of the display panel.

21. The liquid crystal display device of claim 19, wherein the white pattern is provided along the edges of the optical sheet except for one edge corresponding to a light entrance portion in which the light source is located.

22. The liquid crystal display device of claim 1, wherein the adhesive layer does not overlap with the red pixel.

23. The liquid crystal display device of claim 2, wherein the first color light further comprises magenta light, and
   wherein the color conversion layer comprises a green color conversion layer, which converts a part of blue light included in the magenta light into the green light.

24. The liquid crystal display device of claim 23, wherein the green conversion layer overlaps each of the red pixel, the blue pixel and the green pixel.

25. The liquid crystal display device of claim 23, wherein the green conversion layer overlaps the green pixel.

26. A backlight unit, comprising:
   a light source configured to output a first color light;
   a color conversion layer configured to convert the first color light into a second color light, the first color light including blue light and a red light, the second color light including green light, the color conversion layer including a green color conversion layer configured to convert a part of the blue light into the green light;
   a fluorescent pattern along edges of a bottom surface or a top surface of the green color conversion layer;
   an optical sheet configured to diffuse the second color light; and
   an air gap between the color conversion layer and the optical sheet.

27. The backlight unit of claim 26, wherein the color conversion layer includes a mixed color conversion layer, the mixed color conversion layer includes a red light emitting material and a green light emitting material, the red light emitting material is configured to convert the blue light into red light, and the green light emitting material is configured to convert the blue light into the green light.

28. The backlight unit of claim 26, wherein the color conversion layer includes a red color conversion layer configured to convert a part of the blue light into red light, and
   wherein the green color conversion layer is flush with the red color conversion layer.

29. The backlight unit of claim 26, wherein the first color light further includes magenta light, and
   wherein the green color conversion layer is configured to convert a part of blue light included in the magenta light into the green light.

30. A liquid crystal display device, comprising:
   a display panel including a red pixel, a green pixel, and a blue pixel; and
   a backlight unit configured to emit light to the display panel, the backlight unit including:
      a light source configured to output a first color light;
      a color conversion layer configured to convert the first color light into a second color light;
      an optical sheet configured to diffuse the second color light;
      adhesive layer between the color conversion layer and the optical sheet, the adhesive layer overlapping the blue pixel; and
      an air gap between the color conversion layer and the optical sheet.

31. The liquid crystal display device of claim 30, wherein the adhesive layer does not overlap with the red pixel.

* * * * *